United States Patent
Quezada

(10) Patent No.: US 10,185,928 B2
(45) Date of Patent: *Jan. 22, 2019

(54) AUTOMATED RETAIL MACHINE

(71) Applicant: Kiosgo LLC, Los Angeles, CA (US)

(72) Inventor: Douglas Patricio Quezada, Provo, UT (US)

(73) Assignee: Kiosgo LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,331

(22) Filed: Oct. 9, 2017

(65) Prior Publication Data
US 2018/0032950 A1 Feb. 1, 2018

Related U.S. Application Data

(63) Continuation of application No. 14/694,570, filed on Apr. 23, 2015, now Pat. No. 9,785,912.

(51) Int. Cl.
| | |
|---|---|
| *G06K 15/00* | (2006.01) |
| *G06Q 10/08* | (2012.01) |
| *G06Q 30/06* | (2012.01) |
| *G06Q 30/02* | (2012.01) |

(52) U.S. Cl.
CPC ....... *G06Q 10/087* (2013.01); *G06Q 30/0222* (2013.01); *G06Q 30/0635* (2013.01)

(58) Field of Classification Search
CPC ........ G06K 15/00; G06K 19/00; G06F 17/00; G06F 7/08; G06Q 30/00
USPC ............. 235/383, 375, 487, 381; 705/14, 37
See application file for complete search history.

(56) References Cited

U.S. PATENT DOCUMENTS

| | | | |
|---|---|---|---|
| 2015/0379459 A1* | 12/2015 | Russell | G06Q 10/087 235/380 |
| 2017/0267452 A1* | 9/2017 | Goren | B65G 1/137 |
| 2018/0181909 A1* | 6/2018 | Wilkinson | G06F 17/3056 |
| 2018/0201445 A1* | 7/2018 | Battles | B65G 1/1373 |

* cited by examiner

*Primary Examiner* — Edwyn Labaze
(74) *Attorney, Agent, or Firm* — Kirton McConkie; Brian Tucker

(57) ABSTRACT

An automated retail machine controlled by a server which operates by receiving an order for at least one item from a processor, and generating a unique identifier corresponding to the order. The unique identifier serves to both identify and retrieve the order, and also process payment method. The server then transmits the unique identifier back to the processor, which is then sent back to the server from a terminal once the unique identifier is processed and activated therein. The order is then sent to the terminal for vending, in which case, the at least one item is automatically vended. The unique identifier is then cancelled.

20 Claims, 24 Drawing Sheets

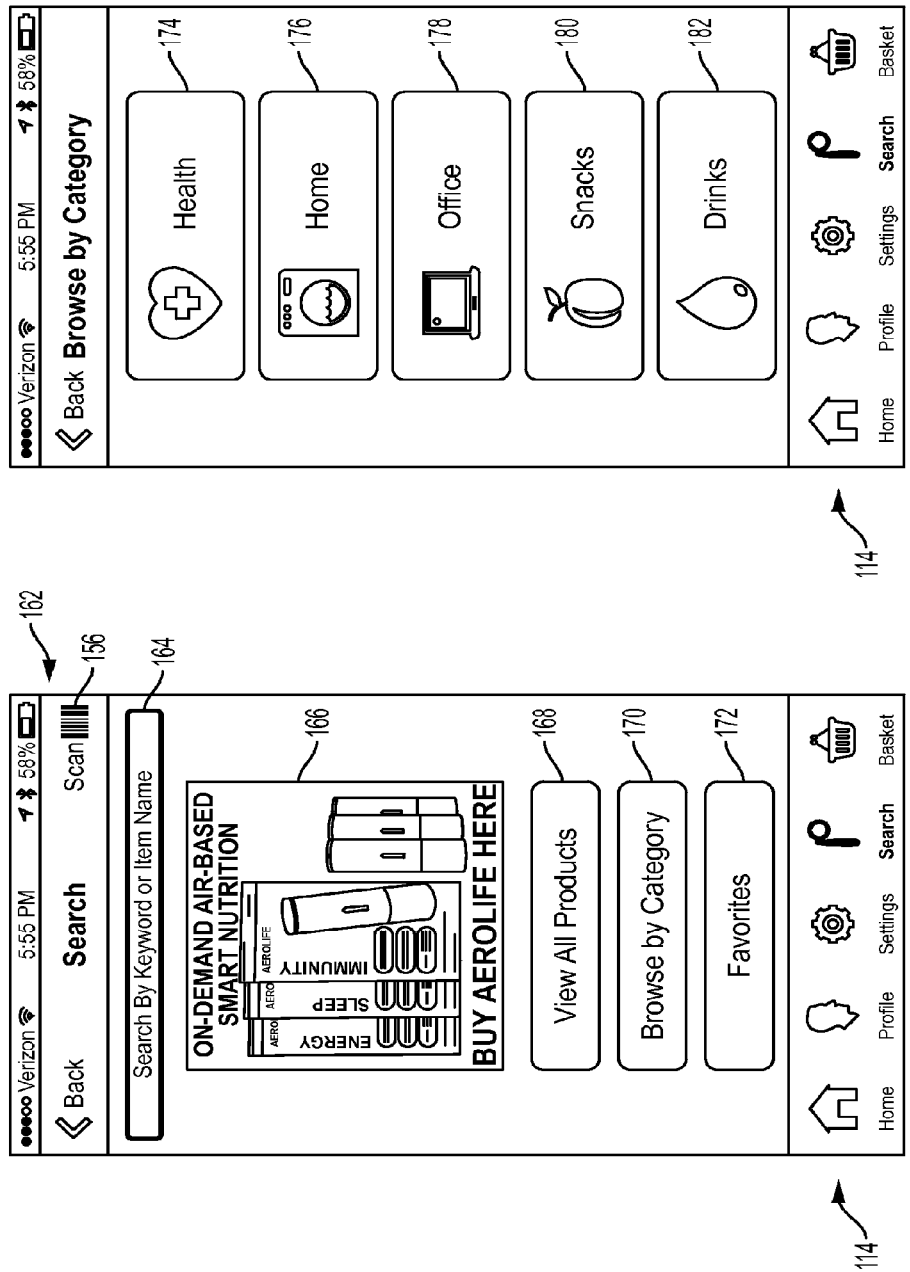

AUTOMATED RETAIL MACHINE

CROSS-REFERENCE TO RELATED APPLICATIONS

This application is a continuation of U.S. patent application Ser. No. 14/694,570, filed on Apr. 23, 2015, now U.S. Pat. No. 9,785,912, and therefore claims the benefit of this earlier filing date.

BACKGROUND

Embodiments relate to an automated retail machine and methods of operation thereof.

BRIEF DESCRIPTION OF THE DRAWINGS

The foregoing and other features and advantages of the invention will be apparent from the following, more particular description of various exemplary embodiments, as illustrated in the accompanying drawings wherein like reference numbers generally indicate identical, functionally similar, and/or structurally similar elements.

FIG. 9 depicts a sample screen shot of a search page;
FIG. 10 depicts a sample screen shot of a browsing page;
FIG. 11 depicts a sample screen shot of a product info page;
FIG. 12 depicts a sample screen shot of a product facts page.

DETAILED DESCRIPTION

Figure 2:
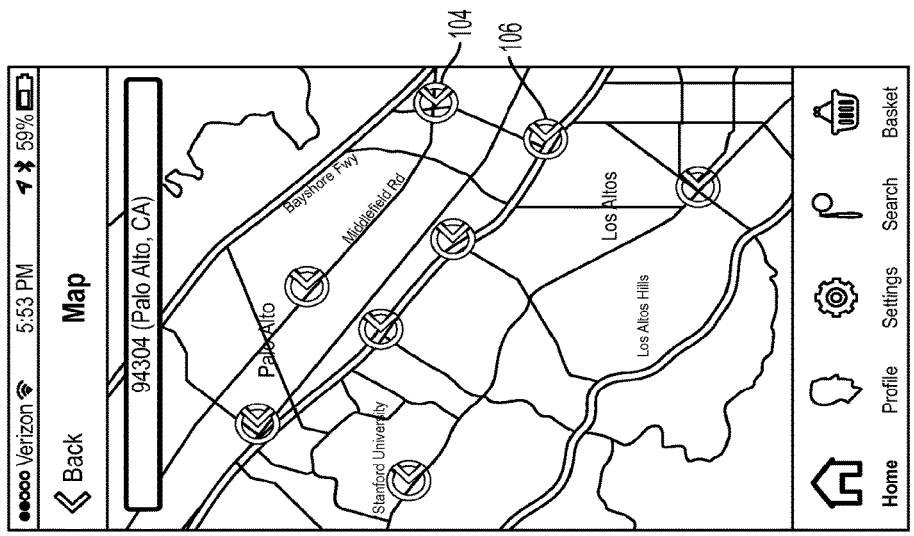
FIG. 2 depicts a sample screen shot of the location identifier and searching mechanism.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

As used herein, the term "a" refers to one or more. The terms "including," "for example," "such as," "e.g.," "may be" and the like, are meant to include, but not be limited to, the listed examples.

The term "processor" may refer to any device or portion of a device that processes electronic data from registers and/or memory to transform that electronic data into other electronic data that may be stored in registers and/or memory. A "computing platform" may comprise one or more processors.

Customers: These are the users, who may use the application to order items, customers may have to sign-up before making any orders. Customers may get a login ID and password to access an account.

The systems and processes described herein may be created using the following development technologies CSSm HTML, MySQL, PHP, JavaScript, XML (in all of its dialects and extended forms i.e.: XUL, SVG, RSS, Atom, SOAP, XHTML, etc.), UIKit, Xcode, Objective-C, Cocoa, jQuery, JSON, C#, VB, C++, ASP, Python, Ruby, Perl, and Markdown. Additionally, other development technologies well known to those skilled in the art may also be used to create the systems and processes described herein.

The retail industry is undergoing a dramatic shift: E-commerce is capturing a larger share of sales than ever before; mobile shopping and payments are beginning to boom. The heyday of big box discount retailers is over. Consumers appear more focused on some combination of value and convenience. For many types of products, consumers are less likely to make a lengthy excursion to super-stores when they could get free delivery online. Yet, for an assortment of vital item categories—most importantly household goods (health and personal care), office supplies and electronics, and consumer packaged goods (food and beverage)—consumers don't want to be holed up in one place and have to wait for the deliveries of their immediate essential needs; consequently, the online and mobile market in these sectors remains largely untouched, undervalued, and misunderstood.

For decades consumers have been warming up to self-serve options—at times using existing, rudimentary vending machines or self-serve kiosks—to fulfill their basic, on-the-go consumer essential needs. While the technologies may indeed be very advanced, many self-serve kiosks of today bear an uncanny resemblance to outdated vending machines, and perform the same limited functions. The only main difference lies in the central technology. The vending machine uses a vending controller board, which is usually a standalone piece of electronic circuitry that is intended for the specific purpose of vending a product. The self-serve kiosk, on the other hand, is a PC-based machine with a range of display and control options, which is usually connected to central network, or the Internet. Still, even today, because of technological limitations on both the vendor and the consumer end, vending machines are primarily used for dispensing products one at a time, and kiosks primarily information. For as much as the hardware and software has advanced, applications for either fields have been immensely limited. One advantage of the present service centers is that it has integrated current and developing hardware and software, allowing for a new shopping experience, and enabling the consumer an exponential increase in transaction speed and convenience, only through the use of a connected device.

Unlike existing technological competitors, certain embodiments of the service center meet the immediate retail needs of communities and commuters alike with a wholly and fully-automated, true 24/7, drive-thru (and walk-up), economical, personalized, mobile-driven shopping experience for the 21st Century. In other embodiments service centers may be fully-robotic, standalone shop that immediately provide customers with their essentials, when they need them, through the connected and mobile devices they use, within the safety and convenience of where they live and commute. In other embodiments, the service centers include home goods, office and electronic supplies, medicines, and other basic health and personal care items, along with healthy and traditional snacks and beverages, and any other seasonal or popular retail items.

Certain embodiments of the service center may be treated as a self-contained automated retail machine which is entirely operated and controlled on and from a connected device through an app or website. In these instances, none of the actual browsing and shopping may be done at the service center, but rather the service center may function as a fully-robotic order fulfillment station. When the user activates one of the service centers for item disbursement with their order's unique identifier (unlike conventional vending machines that select, gather, and vend one item at a time) all of the selected items embedded in the order's unique identifiers may be dispensed at once. Advantages to this process eliminate waiting behind a queue of people browsing, selecting, gathering, and vending their items one at a time for many minutes. In other embodiments, the whole electronic transaction is routed through the servers (versus taking place wholly at the point of sale), which increases security and control of both the purchasing experience and the point of sale.

In certain embodiments the service center allows a consumer to retrieve fulfilled orders of goods, access pre-stocked goods, and/or fabricate goods therein, interacts with a computer, mobile device or smart device, and contains user interfaces displaying advertising, and are comprised of one or more service centers of one or more of the following types: service centers for fulfillment of orders of consumer goods, for consumers to retrieve goods from the service centers that are pre-ordered by computer, mobile device or smart device and then stocked in the kiosks, for retail or rental purposes; service centers for vending of consumer goods, for consumers to retrieve goods pre-stocked in the kiosks for retail or rental purposes; automated 3D printing kiosks for fabrication of consumer goods, for consumers to retrieve goods fabricated in the kiosks that are ordered on site or pre-ordered by computer, mobile device, or smart device for retail or rental purposes.

Additional embodiments provide downloadable computer software, mobile applications, smart device applications and user interfaces for use on computers, mobile devices and smart devices in connection with service centers and other computers and mobile devices, for the purpose of locating service centers, placing and/or completing orders of consumer goods, coordinating delivery of ordered goods, fulfillment of orders of consumer goods, vending of consumer goods, fabrication of consumer goods, and processing payment for such goods; computer software for service centers of one or more of the following types: automated order-fulfillment service centers for fulfillment of orders of consumer goods, for consumers to retrieve goods from the service center that are pre-ordered by computer, mobile device or smart device and then stocked in the service center, for retail or rental purposes; automated retail service centers for vending of consumer goods, for consumers to retrieve goods pre-stocked in the service centers for retail or rental purposes; automated 3D printing service centers for fabrication of consumer goods, for consumers to retrieve goods fabricated in the service centers that are ordered on site or pre-ordered by computer, mobile device, or smart device for retail or rental purposes.

Other embodiments may include advertising services provided in conjunction with service centers. As well as, retail service center services provided at or in connection with the service centers, which services include one or more of the following: automated order-fulfillment services for ordering and fulfillment of orders of consumer goods, to enable consumers to order and have the option to pay for goods via a computer, mobile device or smart device and later retrieve and have the option to pay for those pre-ordered goods from the service center for retail or rental purposes; automated retail services for vending of consumer goods, to enable consumers to retrieve and pay for goods pre-stocked in the service centers for retail or rental purposes, using in part a computer, mobile device or smart device; automated 3D printing services for fabrication of consumer goods, to enable consumers to order and have the option to pay for goods via a computer, mobile device or smart device in advance or onsite, and then retrieve and have the option to pay for those ordered goods from the kiosks for retail or rental purpose.

Even further embodiments may include providing websites and temporary use of non-downloadable software and user interfaces for use in connection with service centers, automated service centers and other computers and mobile devices, for the purpose of locating service centers, placing and/or completing orders of consumer goods, coordinating delivery of ordered goods, fulfillment of orders of consumer goods, vending of consumer goods, fabrication of consumer goods, and processing payment for such goods;

Application

Figure 1:
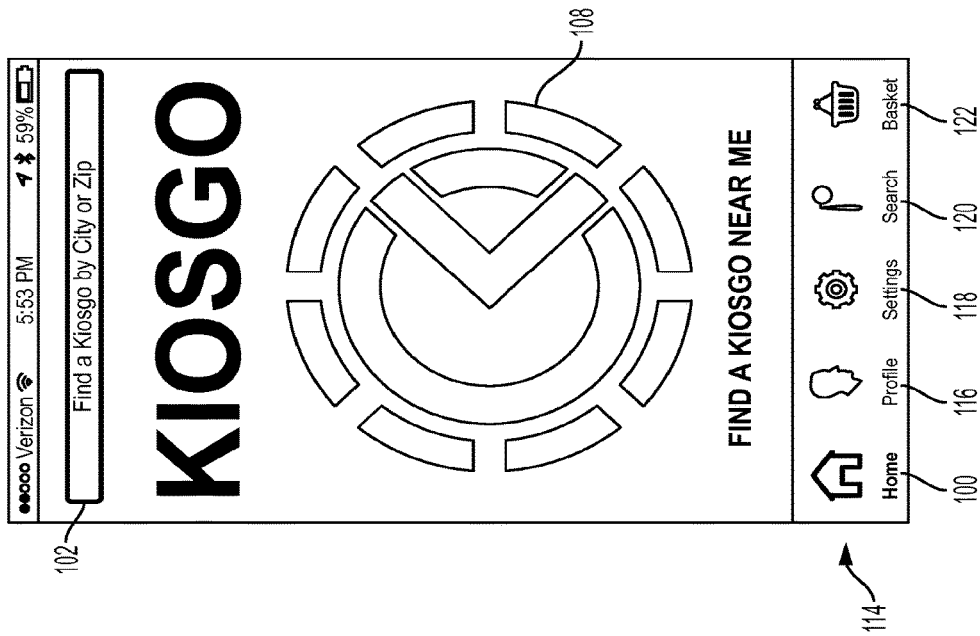
FIG. 1 depicts a sample screen shot of a home page.
Figure 3:
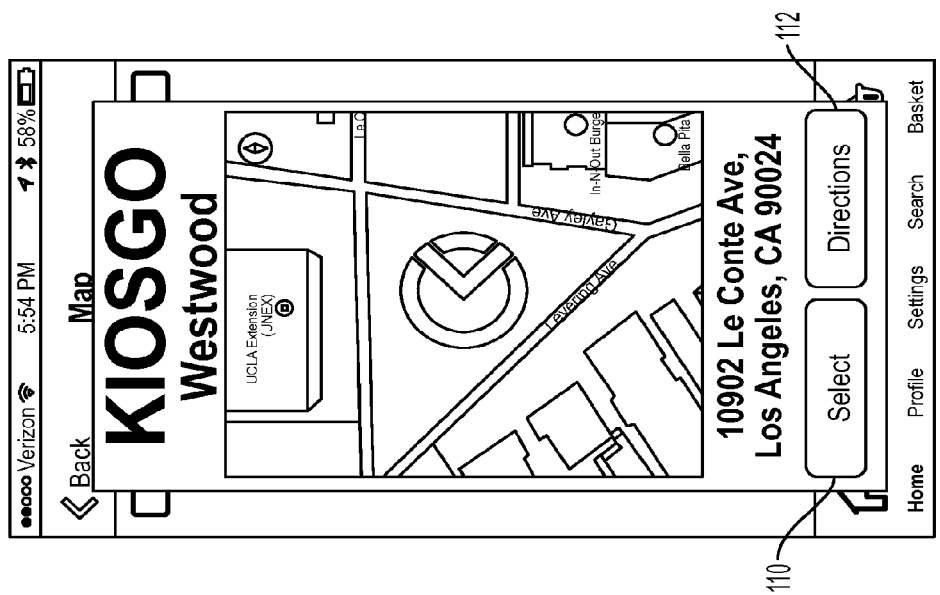
FIG. 3 depicts a sample screen shot of a selected location.

The following provides a preferred embodiment of an application for a user at a service center. The user must first connect with the server via the app or website, where they are initially directed to the main page—the Home page (FIG. 1, 100)—which offers a selection of buttons and functions to choose from to initiate and fine tune the users shopping experience. At the top of the Home page is an input field (102) which allows the user to search for a specific service center by a specific geographical area, for example, by inputting either the ZIP Code, name of the location, or other geographical identifier, which will redirect the user to an interactive Map page (FIG. 2) that allows them to select the desired service center (104, 106). At the center of the Home page (FIG. 1), a logo button (108) may search for the nearest service center based on the user's current GPS location. Once activated, the user will be redirected to the interactive Map page (FIG. 2). The Map page may allow the user to view all available and active service centers in that selected geographical area, at which point the user may select a specific service center to view a picture and exact address of the service center (FIG. 3), in further embodiments, the user may select (110) that specific service center to browse the inventory and shop. Directions (112) to the selected service center can be made available through the Map page (FIG. 3), as well. At the bottom of the Home page (FIG. 1) is the Navigation Bar (114), which includes buttons to direct the user to the Profile page (116), the Settings page (118), the Search page (120), and the Basket page (122).

Figure 4:
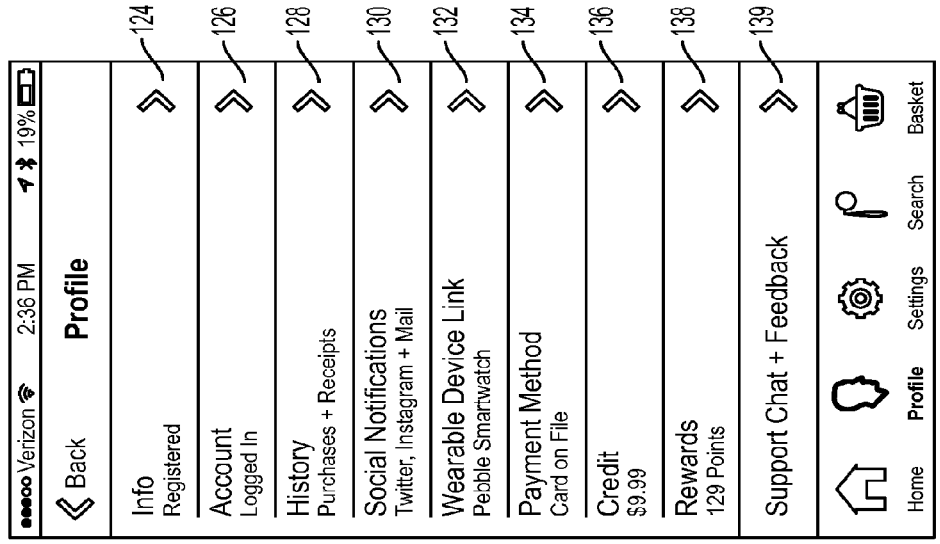
FIG. 4 depicts a sample screen shot of a profile page.
Figure 6:
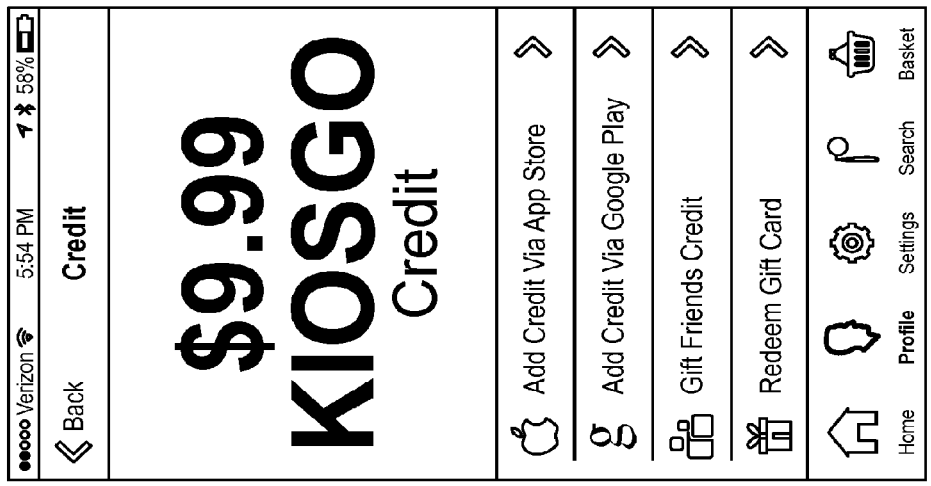
FIG. 6 depicts a sample screen shot of a credit page.
Figure 5:
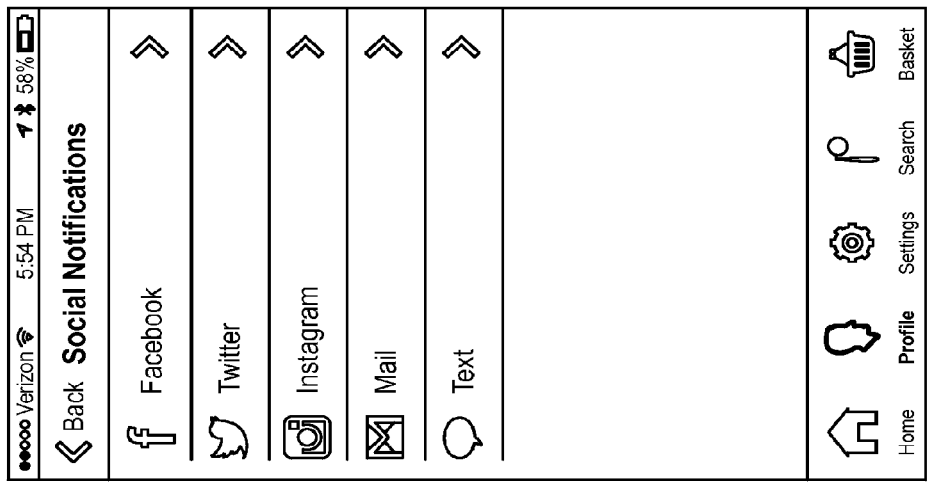
FIG. 5 depicts a sample screen shot of a social notifications page.
Figure 7:
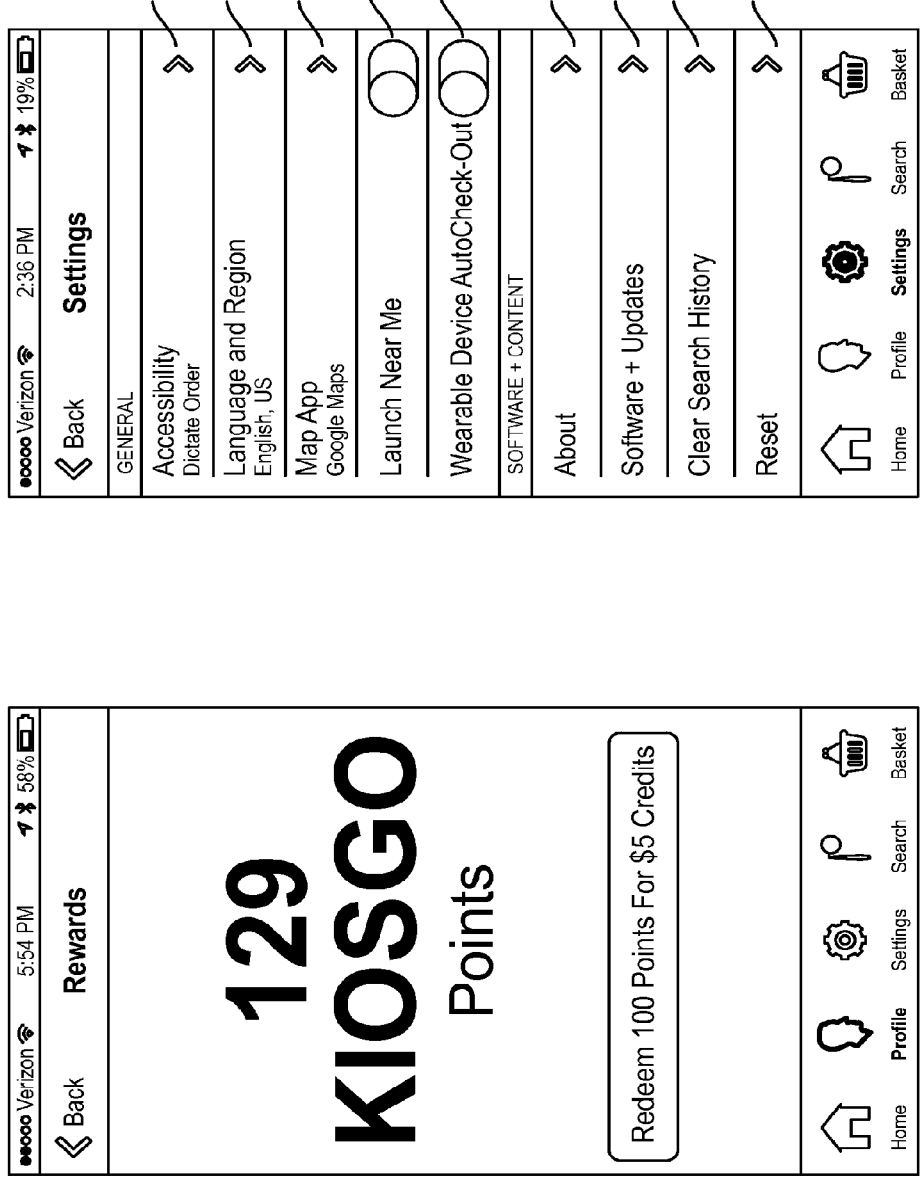
FIG. 7 depicts a sample screen shot of a rewards page.
Figure 17:
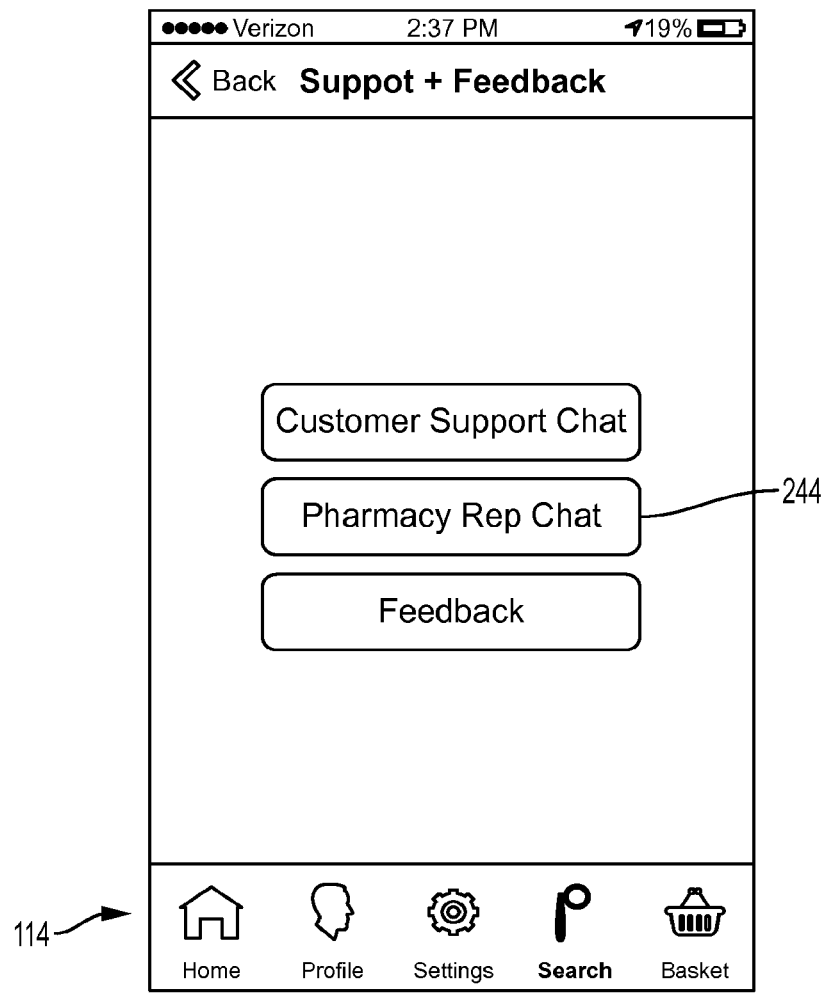
FIG. 17 depicts a sample screen shot of a support+ feedback page.

In the Profile page (FIG. 4), the user can edit and manage their specific account. They can create and select a specific profile in the Info tab (124). Additionally the user may manage and edit that specific profile account under the Account tab (126), in some embodiments, users can add and load several shopping profiles onto a single account, which will automatically adjust all the settings throughout the UI to match that profile's preferences. In other embodiments, users can access the app and website as a Guest and shop without necessarily creating an account or subsequent profiles. Users may view and edit receipts and purchase history associated with that account under the History tab (128). Users may log into and enable social media and message notification feeds to be pushed and displayed onto the service center UI ticker—which is displayed below an advertisement at the time the order is being fulfilled at the service center, displaying prioritized message and social media updates, along with weather and news updates based upon the set location and interest preferences—at check-out in the Social Notifications tab (FIG. 5, 130). In certain embodiments, the user may pair and enable smart wearable devices for check-out in the Wearable Device Link tab (132), and input and select various payment methods in the Payment Method tab (134), methods of payment range from debit card, credit card, or checking account on file, which in certain embodiments, if set as the preferred payment method, will reward the user with a 5% savings, or other forms of cryptocurrency or payments, such as bitcoin or PayPal. Users may buy and add credits onto the selected account through in-app purchases through various app stores, physical gift cards, and gift credits to other users in the Credit tab (FIG. 6, 136), and view, manage, and redeem reward points in the Rewards tab (FIG. 7, 138), which in certain embodiments, allows the user to accrue a point for every dollar spent shopping, which, for example, once 100 points are reached, the user can redeem the reward points for a $5.00 USD credit towards a future purchase. It is well understood that other variations of distributing and generating rewards as known in the art may also be implemented. Finally, the user may send feedback, pictures and comments to a support team, and call or video chat with a support team staff member in the Support Chat+Feedback (FIG. 17, 139).

Figure 8:
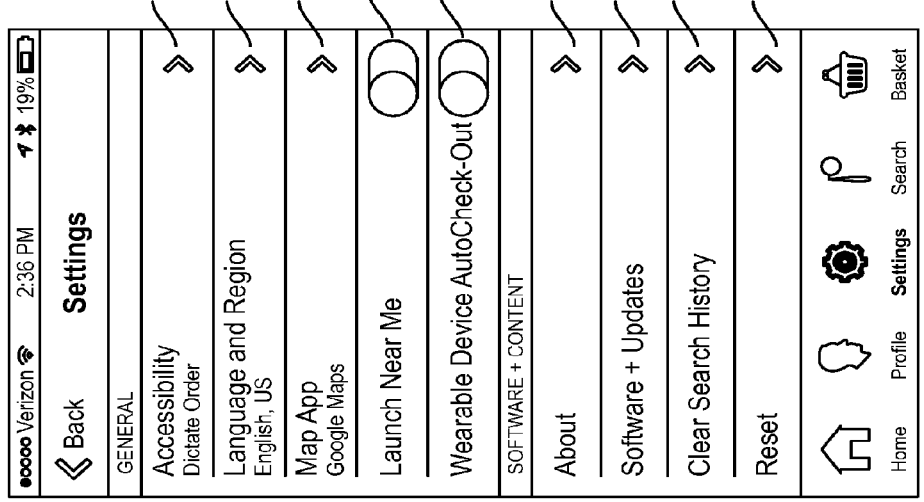
FIG. 8 depicts a sample screen shot of a settings page.

In the Settings page (FIG. 8, 116), the user may modify and prioritize the Home page (FIG. 1) and Category page search (FIG. 10) parameters. In order to improve convenience the Accessibility tab (140) may allow the user to dictate orders through a microphone, via the more particular "Order Dictate" feature. The Language and Region (142) allows the user to select a default language and regional unit setting. The user may select the preferred map app for the Map page under the Map App tab (144) e.g., Apple Maps, Google Maps and Waze. The user may further turn on or off the feature that enables for automatic search in the immediate vicinity upon app launch in the Launch Near Me switch (146). Another switch may be present, which is able to turn on or off the feature that automatically pushes a newly generated unique identifier code to the paired smart wearable device in the Wearable Device AutoCheck-Out (148). The user may review software and company info in the About tab (150). The Software+Updates (152) allows for in-app updates to the app itself, these updates may be extended wearable devices. The user may clear search history and reset general preferences in the Clear Search History tab (154)—search history data (what's typed and entered into the input fields, what category or item buttons are clicked on and viewed for certain periods of time, and especially what is added to the favorites list, bucket, and purchased) is anonymously collected and used in determining user preferences, suggestions, and targeted advertising (of which the user can submit an opt-out request). A Reset tab (155) may also be present, which resets the current user's account to the initial settings.

Figures 11, 12:
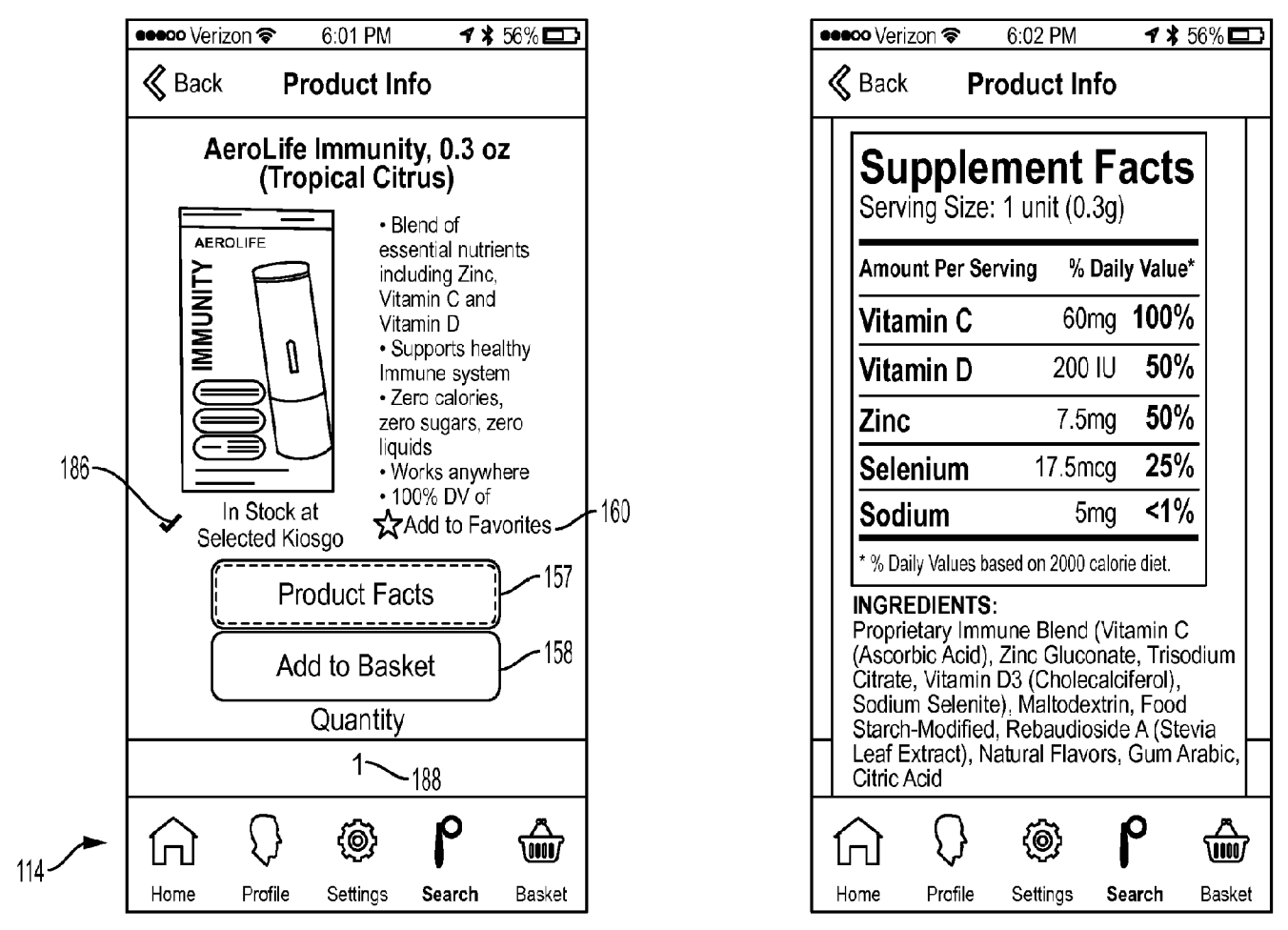

In the Search page (FIG. 9, 120), the user can select from a variety of categories to browse and shop from. At the top right corner of the Search page (FIG. 9), the user can select to use the camera (156) on the connected smart device (if enabled or featured) to scan and read barcodes from the barcodes of previous purchases to immediately queue up that items Product Info page (FIG. 11), the Product Info page (FIG. 11) may contain links to product facts (FIG. 12, 157), add the selected scanned item to the Basket (158), or to add the item to the user's Favorites list (160). Underneath the top navigation bar (162) lies an input field (164) so that the user can find or search for items by entering a keyword or specific product name. Underneath the top input (164) field may be an advertisement (166) for any featured products or for offers. Beneath the advertisement lies several methods of browsing and selecting inventory items; the user can browse through the complete inventory in the View All Products button (168); browse through specific product categories in the Browse by Category button (170); and select a favorite item in the Favorites button (172). Searching for and selecting specific inventory items, in relation to specific service center locations (104, 106), can be done in primarily two forms: the user can select a specific service center from the Home page (FIG. 1) (and Map page (FIG. 2)) and can shop from that service center's item inventory; or the user can go directly to the browsing and shopping sections and find the nearest corresponding service center with all the available inventory. Since products aren't charged to the account until confirmation of proper order fulfillment at the service center, items may be sold on a "First come, first serve" basis, i.e., first one to the service center to pick-up receives the order. For a monthly premium, items may be charged ahead of time and will be reserved at the terminal until the order is picked up within a fixed window, in some embodiments the window is 24 hours. If the user misses their window within the time the bucket is remotely checked-out and paid for, the items are unreserved and freed up for purchasing by a different user.

In the Browse by Category button (FIG. 10, 170), the user can select from five basic categories: personal care, hygiene, wellness items in the Health button (174); home items and supplies in the Home button (176); electronic, computer, and audio items in the Office button (178); and both healthy and traditional packaged foods and beverages in the Snacks button (180) and Drinks buttons (182), respectively.

Once the user is browsing the selection in those inventory categories, and chooses an item for viewing, the user is directed to that specific item's Product Info page (FIG. 11), which may be created, categorized and organized by an application manager, and where an interactive picture and brief description of the product is offered. The user may view in this same page whether the product is available at the specific selected service center (186) (if one is selected), add the product to the Favorites list (160), view specific product facts (157), and lastly pick the quantity (188) of the item and add it to the Basket page (158).

Figure 13:
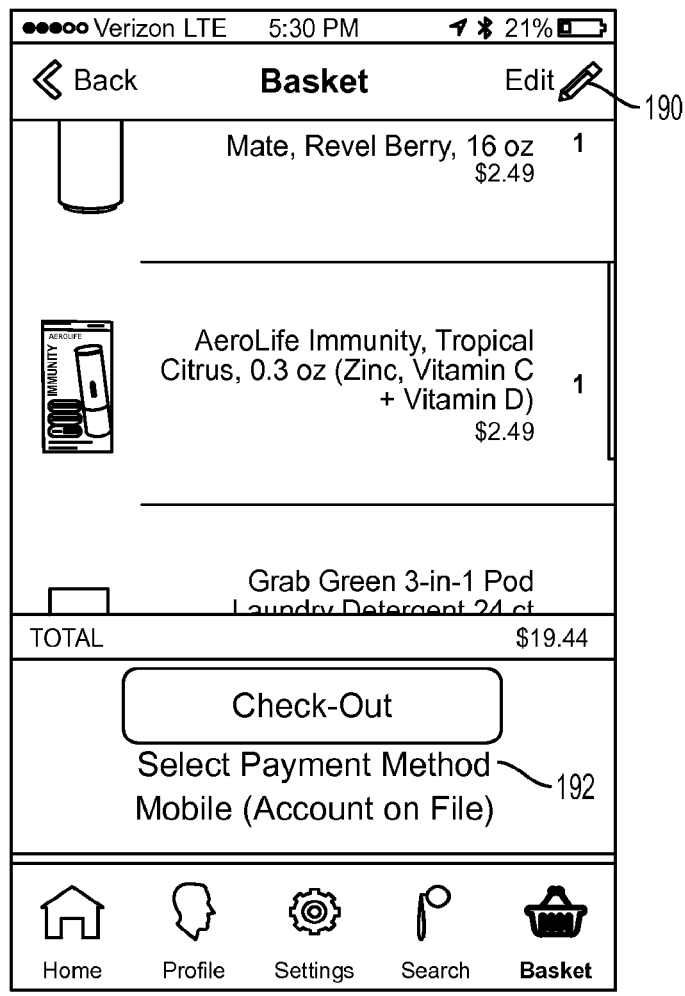
FIG. 13 depicts a sample screen shot of a basket page.
Figure 14:
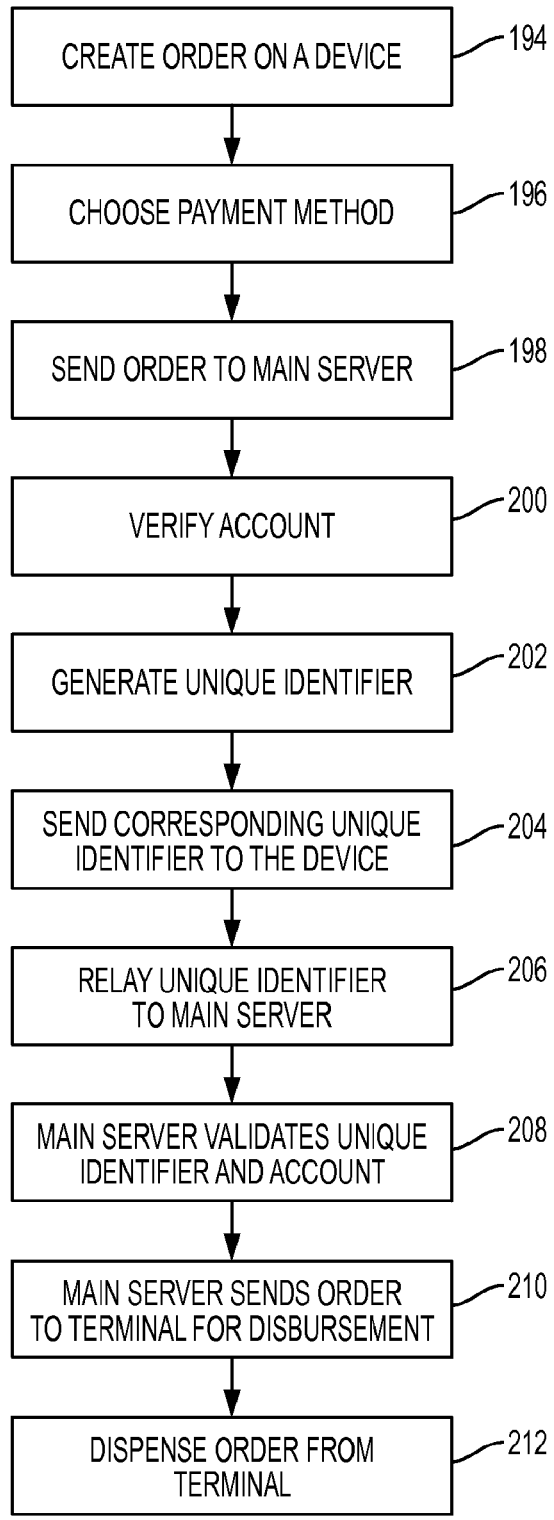
FIG. 14 depicts one embodiment of a general check out process.

Once the user selects their desired items to the Basket page (FIG. 13, 122) on that same page the user has the ability to edit the items in the basket (190) and complete their order, and choose a check-out payment method (192), (via the app using the card on file, or cash or credit at the service center). Which will allow them to follow the general checkout process shown in FIG. 14.

The general check out process (FIG. 14), begins once the user finishes creating their order (194), and then chooses a payment method (196). The order is then sent (198) to the main servers; the server verifies the account (200) and generates a unique identifier for the order (202); the main servers then send a valid secondary unique identifier to the smart device (204) (which corresponds to the initial unique identifier located in the main servers) for order retrieval at the service center (all the order information—which includes but isn't limited to the user account number and information, payment method, order number, and order basket information—may be kept within the server back-end and not sent to the user through the corresponding secondary unique identifier). Once the secondary corresponding unique identifier is relayed from the smart device at the service center to the server (206), the server confirms and validates (208) both corresponding unique identifiers and the associated account (verifying that the unique identifier has been generated at the main servers and that the unique identifier is still active), then sends the corresponding order to the service center for disbursement (210); the unique identifiers are frozen and are put into standby mode until the order is fulfilled (to prevent multiple uses or any other manipulation of the unique identifier); the terminal is activated and begins to dispense (212) the items and fulfill the order.

Figure 15:
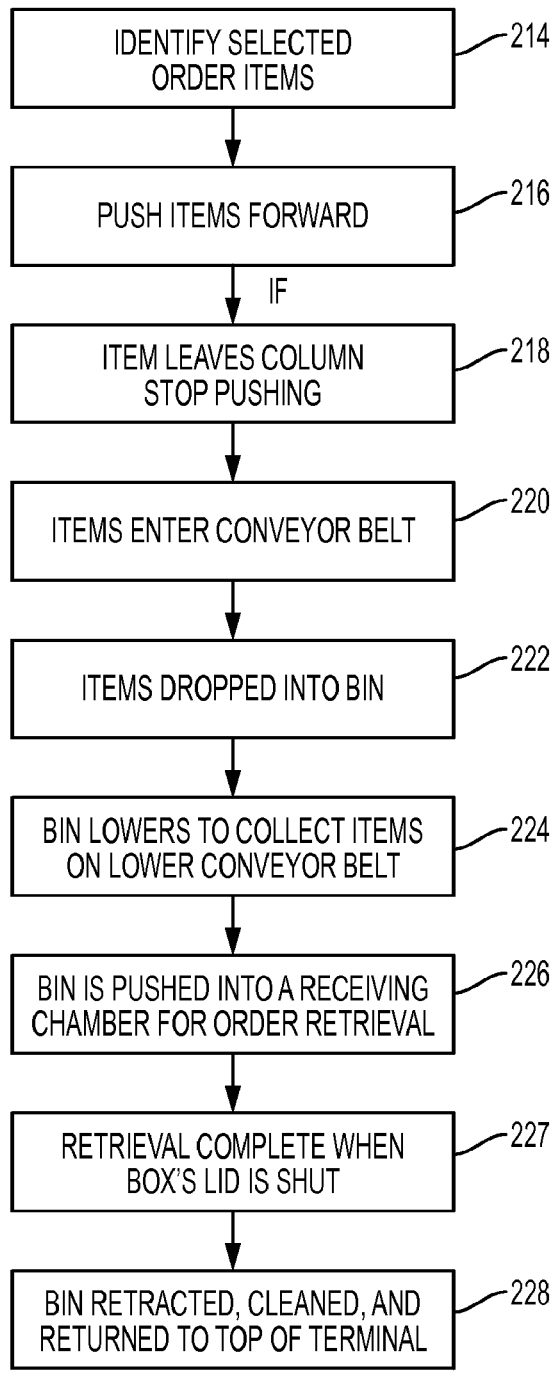
FIG. 15 depicts one embodiment of a disbursement method.

Once the disbursement and fulfillment order is received at the service center from the servers, the terminal follows the disbursement method shown in FIG. 15, in which the terminal identifies all selected inventory (214) inside the service center, which is then moved up at the same time (216) by a paddle at the back of each column; laser sensors at the end of each column monitor and detect item disbursement and tell the paddles to stop pushing once the proper function has been executed (218); items drop off their columns onto a conveyor belt (220), which drop the items into the item bin (222); guidance rods and sloped insides of the item bin ensure items don't tumble in; upon item bin detection at each level, both sides of conveyors drop off their selected items inwards into the item bin; this cycle is repeated until the item bin reaches the bottom (224); meanwhile, an advertisement clip (with the social notification ticker at the bottom) is playing on the service center interactive user interface during order fulfillment as the user waits for the service center to gather the items into the item bin, with a corresponding still page ad pushed to the smart device at this same time.

Once the item bin reaches the bottom, the ads cease on both the service center UI and the smart device, and a prompt on both the service center UI and smart device indicate to the user that the order has been fulfilled and that the items are ready to be retrieved from the item bin; a telescoping arm pushes the bin out into a retrieval box for customer item removal (226); after the retrieval box's lid is locked shut and the order is completed (227), the telescoping arm retracts the bin back in, which is flipped upside-down in a radial twisting motion; any left-over items or trash is dumped into the trash receptacle (228); the run is completed and the bin returns to its starting position (228) and is sanitized (228) for the next order.

Figure 16:
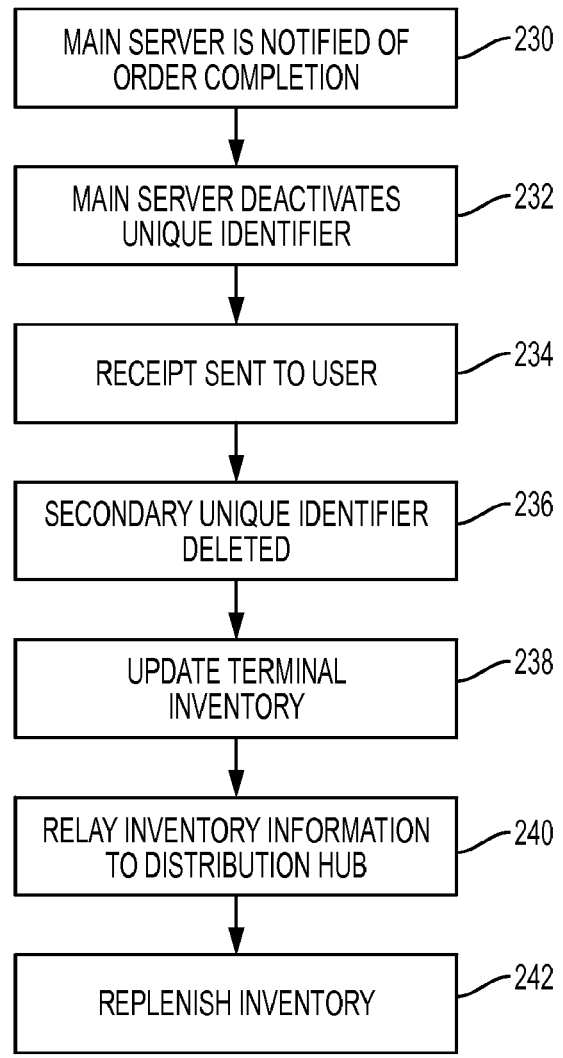
FIG. 16 depicts one embodiment of completion method.

Finally, the completion method may be implemented, as shown in FIG. 16, in which, the main servers are then notified by the service center that the transaction has been completed (230); servers deactivate the initial unique identifier (232) and ends the transaction; a receipt is sent to the email and/or app (234); the app deletes the corresponding secondary unique identifier on the account and/or device (236); the inventory is updated (238) and sent to the distribution hub (240) for nightly terminal stock replenishment (242).

In other embodiments, the application provides methods for vending restricted items, e.g., alcohol, prescriptions drugs, items which have a minimum age requirement, and items which can only be sold in limited quantities. In one example for distributing restricted items which have a minimum age requirement or can only be sold in limited quantities, the procedure for ordering the items may proceed as previously described. Additionally, the user may be required to input additional information into the account which can be screened in order to ensure its accuracy, as well as linking all accounts with restricted access, or allowing the user only one restricted account. Additional information may come from state issued identification cards, passports, or other forms of identification which unique to the user.

In order to receive the order, a verification of the user's identification occurs at the automated fulfillment center. In some embodiments, this goes beyond confirming verifying the unique identifies. For example, including forms of secondary unique identifier which may include finger prints, rental scans, vein matching, facial recognition, independent identification cards, and secondary passwords. These secondary unique identifier processes may be incorporated into the automated fulfillment center and/or at least one external processor. Once the unique identifier and secondary unique identifier are verified, distribution of the restricted items is initiated.

In one example of distributing restricted items which are prescribed, a prescriber, authorized to prescribe the items is contacted and/or contacts a source for verification of the prescription. Various methods may be employed to ensure the prescriber is authorized to prescribe the items. Verification may be done either by calling in to a call center, or on a wireless platform. The prescriber has to ability to specify purchase information, which may include the number of the item which may be distributed in each disbursement, when a disbursement may occur, and/or if a disbursement may be repeating.

Figure 18:
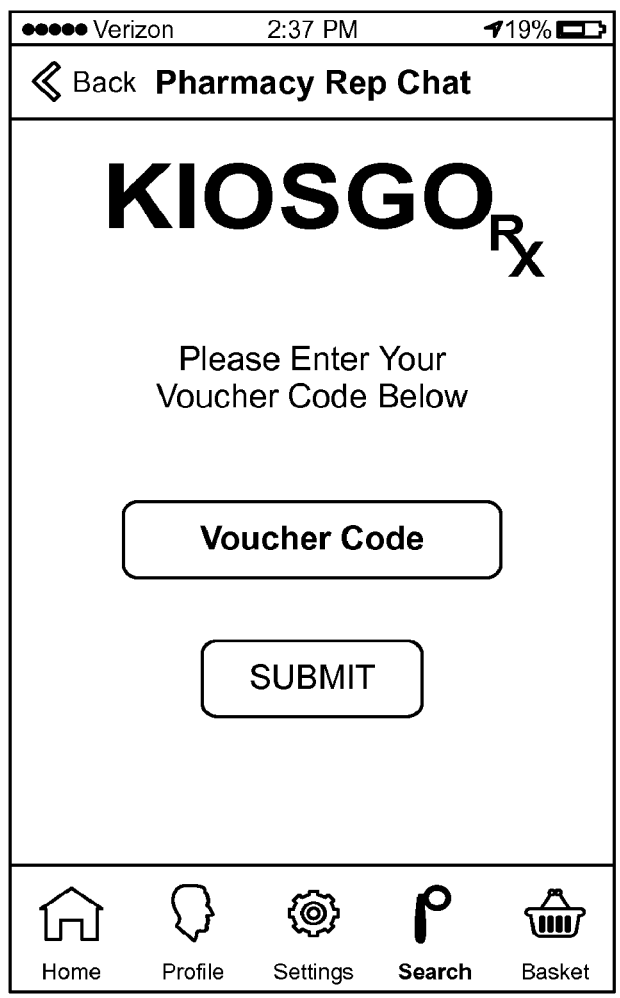
FIG. 18 depicts a sample screen shot of a pharmacy rep chat page.

In embodiments, where the application and service center allow for distribution of restricted items, the user may be given a pin to talk directly with a pharmacy representative, selecting Pharmacy Rep Chat (244), in the Support Chat+ Feedback tab (FIG. 17). This allows users to then enter their pin as shown in FIG. 18. Once a user enters their pin and decides to proceed, the user's information is sent to a pharmacy representative, and the user is connected.

Once the prescriber and prescribed item is verified, the prescribed item is sent to the user as a notification, which may also contain the purchase information. The user may then select an automated fulfillment center and request that the prescribed item be distributed from that location. After the user selects an automated fulfillment center, an estimate is given for when the prescribed item may be picked up, and the order of prescribed item is sent to a distribution center to acquire to the prescribed item. The prescribed item is then sent to the automated fulfillment center and set in a unique chamber. Once the prescribed item is ready for distribution, the user may be notified.

In some embodiments, the service center may contain already contain a supply of the restricted item, for instance popular anti-depressants, antibiotics, and other prescription medications which are commonly needed. In most cases opioids and other more expensive restricted items may be required to be delivered and not kept on site.

Figure 20:
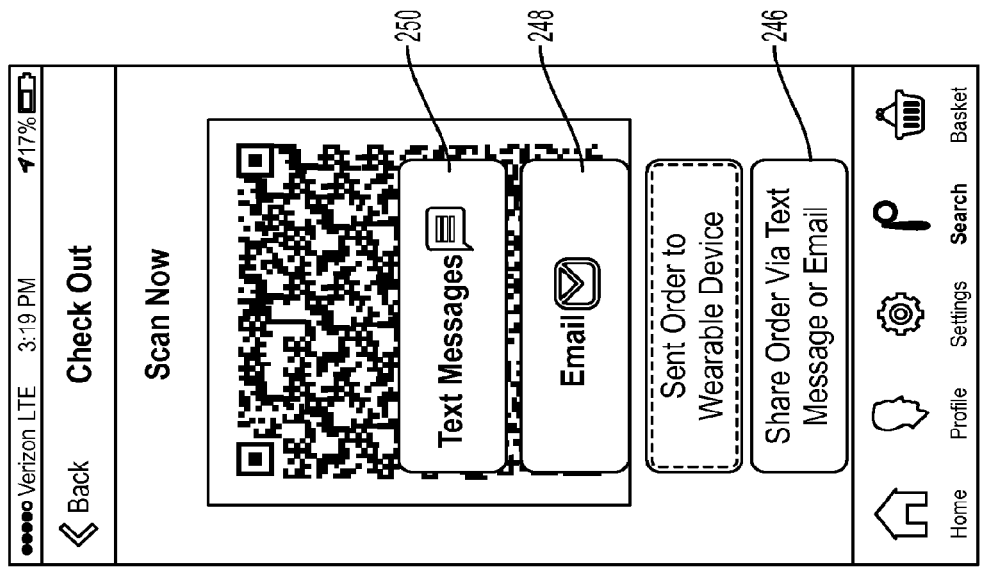
FIG. 20 depicts a sample screen shot of another embodiment of a checkout page.
Figure 19:
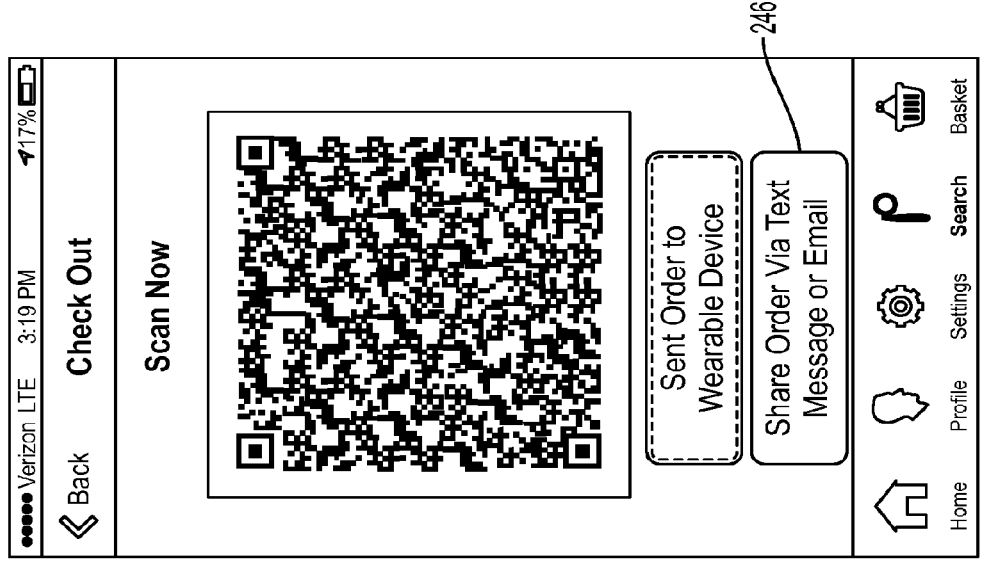
FIG. 19 depicts a sample screen shot of a check out page.
Figure 21:
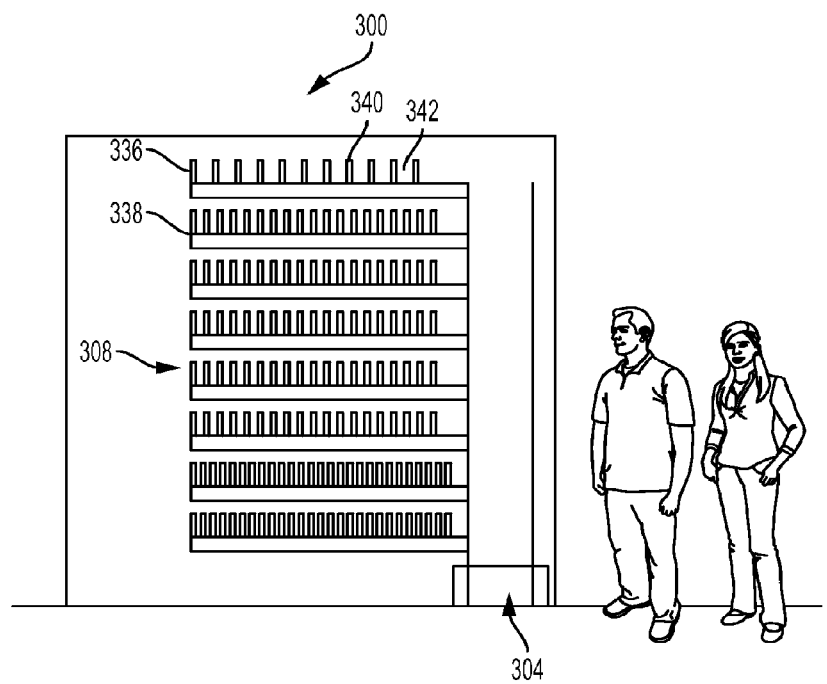
FIG. 21 depicts one embodiment of the service center.
Figure 22:
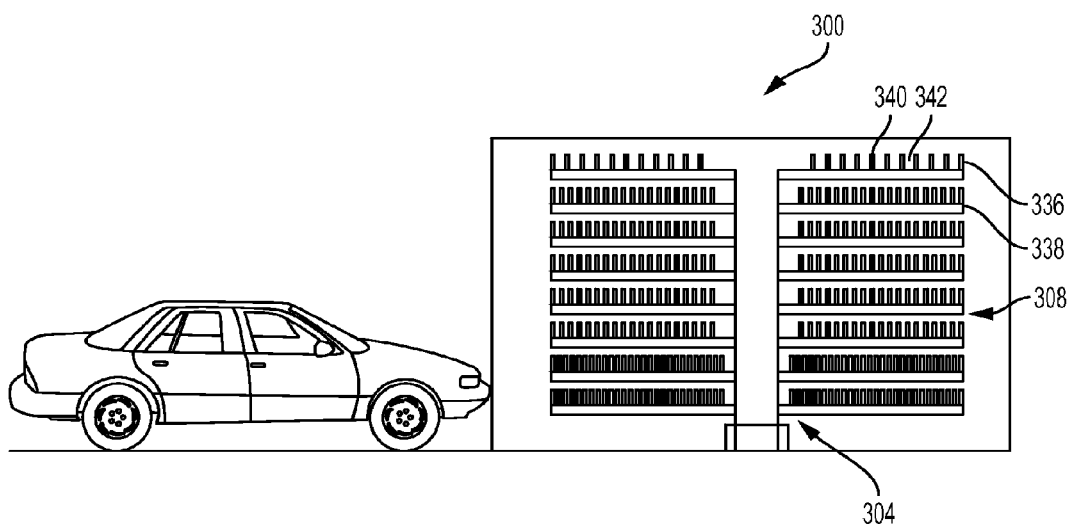
FIG. 22 depicts one embodiment of the service center.

The user may be required to use a secondary unique identifier, in preferred embodiments, the secondary unique identifier is a state id. In some embodiments, an account which may order restricted items may contain 1 or more additional user, each with their own secondary unique identifier. The additional users may be authorized to accepted the restricted items on behalf of the user. In certain embodiments this may be done once the unique identifier is generate, for example as shown in FIG. 19 and FIG. 20, where the user may share the unique identifier via text message (250) or email (248), using a share button (246). In other embodiments, the sharing of the unique identifier may be maintained through the application.

An illustrative example of operation of the system is depicted as follows. After running out of an essential household product, a user creates an order to replenish the needed house-hold products. Knowing the locations of the service centers, the user is able more efficiently collect their order without disrupting their typical routine. Conventional methods require going to a usually large establishment, which requires time for parking, searching for the goods within the establishment, and check-out lines. In some instances, establishments are designed to keep users inside longer, by placing essential house-hold products in the back of the establishment, requiring users to traverse the entire facility. By having orders ready to be filled at a service center, the user may more quickly acquire the needed products with a shorter delay.

Service Center

The following provides a preferred embodiment of a service center for use by a user; shown in FIGS. 21-25 are exemplary embodiments of a service center (300) for vending retail goods. In some embodiments, the service center (300) may be less than 150 square feet, in other embodiments from about 100 to about 1000 square feet, in additional embodiment, from about 200 to about 600 square feet, and in preferred embodiments about 300 square feet. Some embodiments may have a total volume from about 1800 to about 4500 cubic feet, in other embodiments about 2300 to about 3500 cubic feet, and in preferred embodiments about 2700 cubic feet.

In exemplary embodiments, the service center is LEED certified and/or solar powered.

In some embodiments, a path (302) may run adjacent or through the service center (300) in order to allow customers access to a terminal (304). The path (302) is preferably paved and designed to accommodate vehicles.

The service center (300), may also be include specific access (306) for supplying the service center (300), such as doors or removable window, or any type of portal, which allows a supplier access into the service center (300) to stock the storage assembly (308). A person skilled in the art would be able to determine how to create access into the service center (300) and how to assemble the specific access (306) depending on how the service center (300) is designed.

The terminal (304) may be designed such that it may accessed by any customer who approaches with or without a vehicle. However, in a preferred embodiment the terminal aligns properly with a vehicle's windows, so a customer does not need to leave their vehicle in order to remove vended items. In some cases, the terminal may be about 2 to about 4 feet off the ground, or preferably about 3 feet of the ground.

The terminal (304) comprises at least one interface. And in exemplary embodiments contains an interactive screen (310) for displaying and receiving various communications, for example, advertisements, live video chat, payment information, user information, and various options for controlling or operating the service center. The live video chat feature is especially useful as it would allow a staff member to help address any immediate needs or concerns, as well as, providing additional levels of customer security. Other interfaces may include unique identifier readers, key pads, RFID scanners, slots for receiving cash, credit, or debit cards, barcode scanners, QR (Quick Response) Code interfaces, NFC (Near Field Communication) interfaces, Mobile Web Payment (WAP or Wireless Application Protocol) interfaces, Magnetic payment technology (MST or Magnetic Secure Transmission) interfaces, Cloud-based mobile payment interfaces, audio signal-based payment interfaces such as Near Sound Data Transfer (NSDT), and other interfaces as known in the art which would allow one to enter information into the terminal (304).

The terminal may also include a video camera for security, assistance, or advertising purposes. The camera may monitor the terminal indefinitely, or in some embodiments, the camera or terminal activates when there is a physical presence detected within the service center's enclosure. In some embodiments, the terminal or camera only activates when a vehicle is detected. The vehicle may be detected by magnetic sensors, camera recognition, or other means known in the art.

Figure 26:
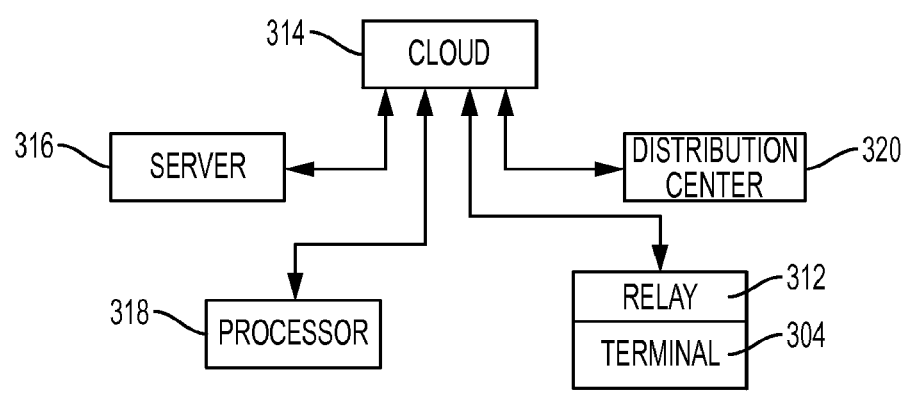
FIG. 26 depicts an illustrative network for use with methods and systems described herein.
Figure 27A:
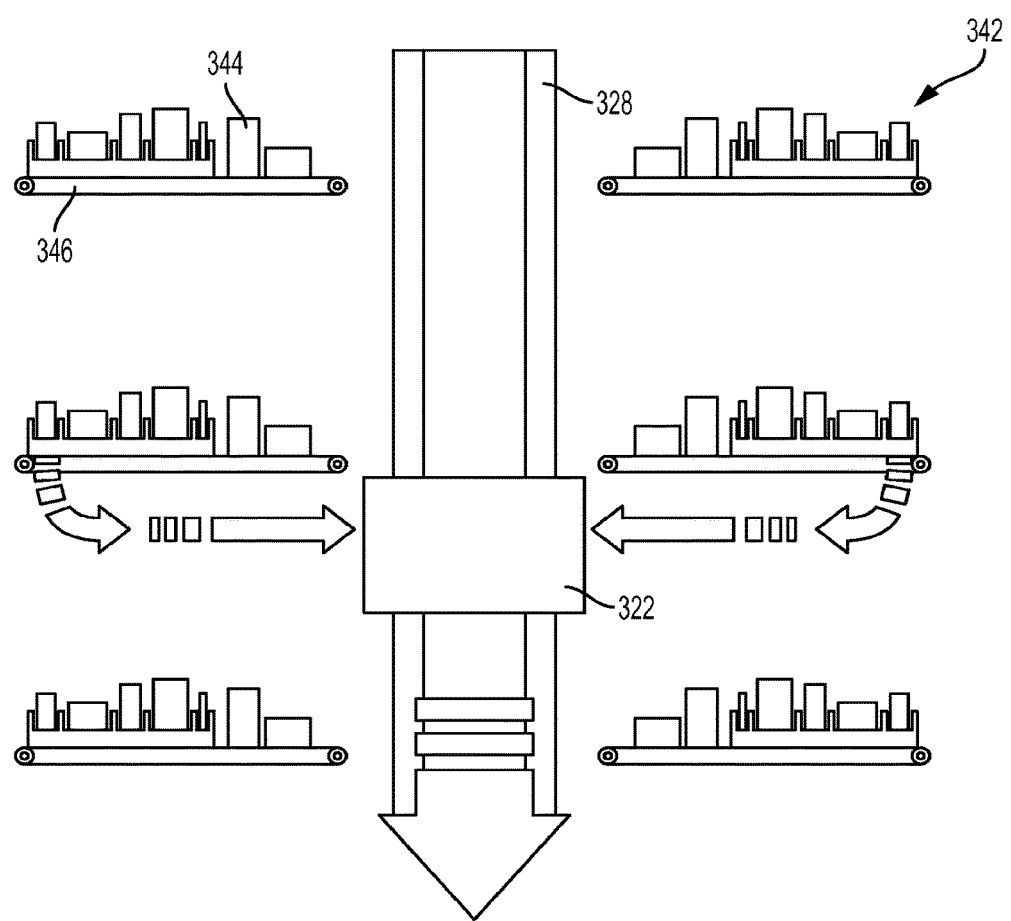
FIG. 27A-E depict one embodiment of the storage and vending assembly.
Figure 27B:
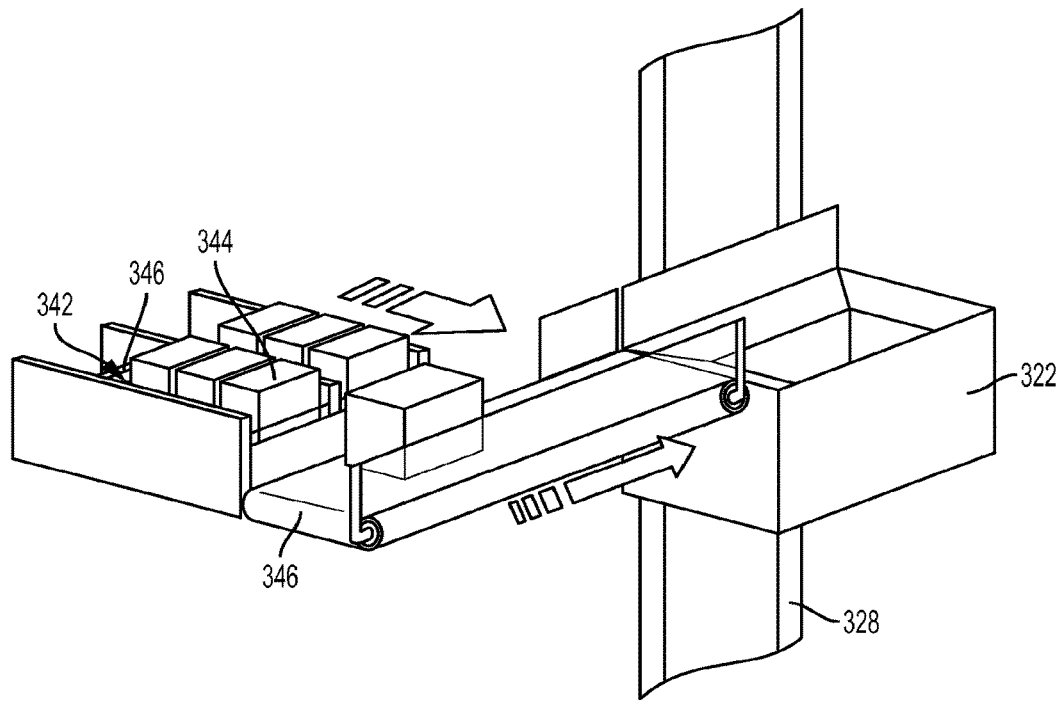
Figure 27C:
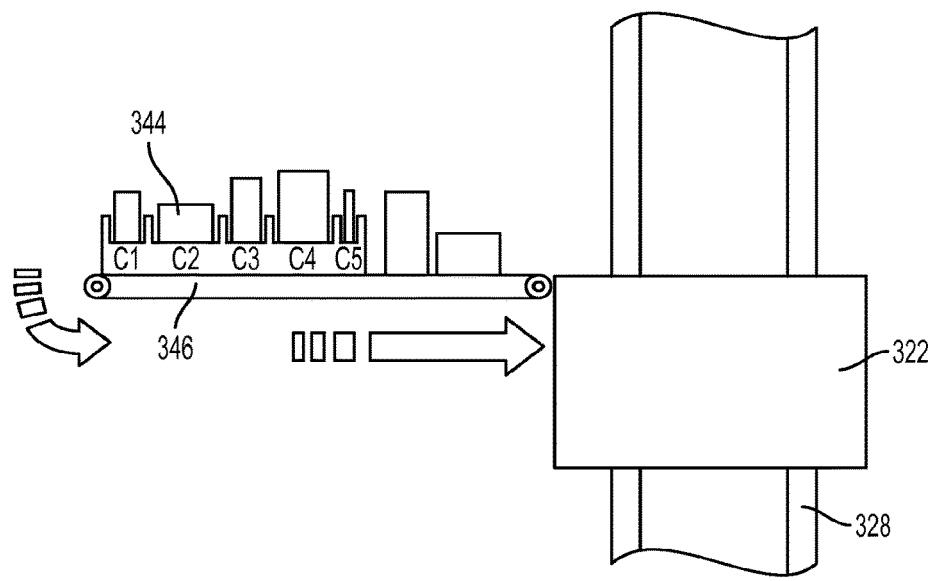
Figure 27D:
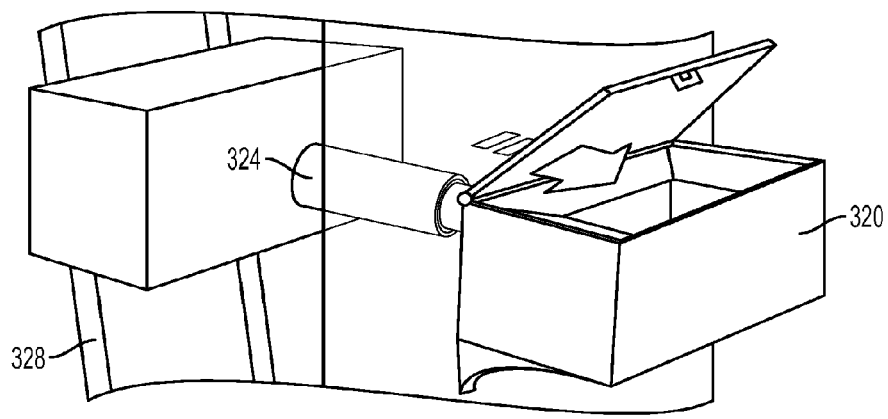
Figure 27E:
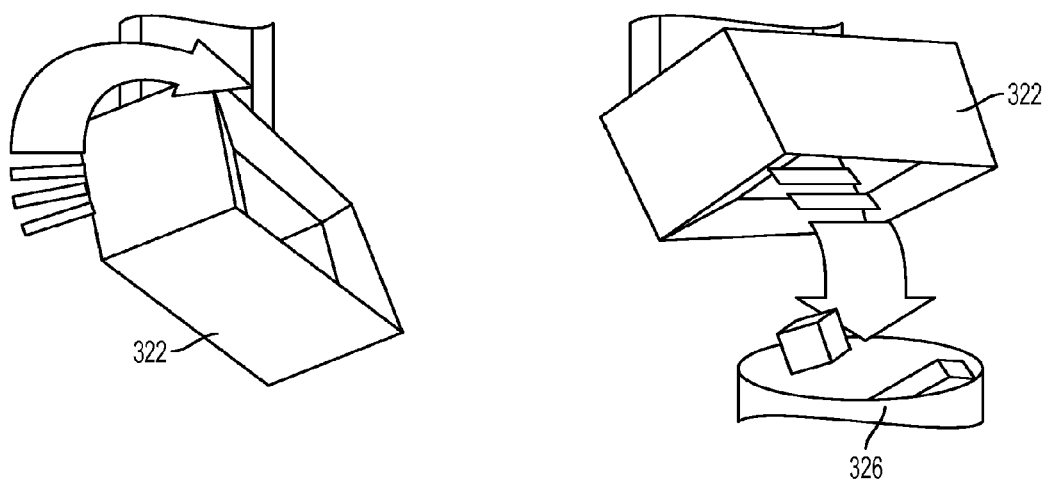

In addition to the at least one interface, the terminal (304) includes a relay transmitter (312) for connecting to the cloud (314), as shown in FIG. 26, which in turn allows the terminal (304) to communicate with at least one server (316) and/or at least one processor (318), and/or the distribution center (320). Relaying methods are known in the art and may be wired or wireless and over a variety of different signals.

The terminal (304) may include a retrieval chamber (320). The retrieval chamber (320) may be sealable and securable in order to prevent access when goods are not being vended. Other features of the retrieval chamber (320) would be known to persons skilled in the art in regards to its function of allowing a customer to receive vended items. Accordingly, this means any article which may protect the receptacle (322) as it delivers vended goods to the customer may be considered a retrieval chamber (320). In exemplary embodiments, the retrieval chamber (320) is rectangular and has a volume of about 1,800 cubic inches, or preferably about 30 L. Or as in other embodiments is a sealable slot.

The retrieval chamber (320) may include a mechanism which detects when the receptacle (322) is inside the retrieval chamber (320). Methods of detecting can be done for example, by laser sensors, magnetic sensors, mechanical trips, RFID sensors and other various means known in the art.

In order to reach the retrieval chamber, some embodiments of the receptacle (322) include a mechanical arm (324) capable of telescoping outward. In other embodiments, the mechanical arm is able to turn the receptacle (322) over its side and/or front section, in order to assist the customer with retrieval of the items or to discard any items, into a collection area (326), which may be in the receptacle (322) after the order is complete.

The mechanical arm (324) may also be attached to a lift track (328) for moving the receptacle up and down. After the order is complete the receptacle (322) may undergo sanitization via a sanitization module (330), either at the top or bottom of the lift track. Methods of sanitization may include UV radiation, commercially available spray cleaners, or other methods as known in the art.

In some embodiments, the receptacle (322) includes sensors, for example, weight, laser, RFID, or other sensors as known in the art, in order to determine what items are present within the receptacle (322), and when they are removed.

Other features of the receptacle (322) may include sloped insides to allow the items entering the receptacle to slide in rather than fall. Other guidance methods may include tilting the receptacle to create the sliding wall, or placing additional elements to organize the items once they are in the receptacle. One method for organizing the items once they are in the receptacle may involve using additional prongs to push them in place.

In an exemplary embodiment, the receptacle (322) returns to the top of the storage unit (308) after each order is complete. The storage unit (308), may comprise one or more shelving units (332, 334) which contain one or more shelves (336, 338). In a preferred embodiment, the receptacle (322) rests between two shelving units (332, 334).

In some embodiments, the shelves (336, 338) contain a plurality of spacer (340) with optionally variable spacing defining chambers (342). In an exemplary embodiment the spacers (340) at the higher shelves (336) are spaced further than the spacers (340) at the lower shelves (338). This may allow larger items to be stored higher in larger chamber (342), and in turn be placed at the bottom of the receptacle (322) such that there is less likely to be an overflow in the receptacle (322).

In order to get each item (344) to reach the receptacle (322) from a respective chamber (342), a plurality of methods may be employed, as evidenced by FIGS. 27A-E. For instance including in each chamber (342) a distribution mechanism (346), many distribution mechanisms are known in the art, for example, rotating coils, placing the chamber (342) on a slope and with a quick release-and-reset mechanism, or as in a preferred embodiment, using paddles to push the items out of the chamber (342). In some embodiments, the receptacle may move underneath the chamber (342), in a preferred embodiment, the chamber (342) releases the item (344) onto a conveyor belt (346) to transfer the item (344) to the receptacle (322). Sensors (not shown), as known in the art, and as previously described, can be placed on the conveyor belt (346) or chamber (344) to monitor the transfer of the items (342).

In a preferred embodiment, when the receptacle (322) starts at the top of the storage unit (308), items will be vended in series such that the receptacle may continuously move toward the retrieval chamber (320). This process allows for the most efficient collection of the items (344) as the receptacle will take the most direct route to the retrieval chamber (320).

In certain embodiments, service centers are designed and built with modularity and ease of modification in mind. This allows developing and future technology (such as 3D printing) to be easily integrated and implemented into the existing service centers, and for the service centers to be easily installed and removed in certain areas, thus allowing the terminals to go wherever the real-life user traffic and density is. The modular aspect of the service centers is the enclosure covering the actual storage, delivery, and manufacturing hardware. The enclosure is made up of connecting, interchangeable, insulated reinforced panels that can be used to modify the functionality, capacity, and architectural design of the service center to accommodate new hardware and the overall positioning of the terminal.

3D Printing

In other embodiments, the service center will allow for the manufacturing of 3D printed goods. Using the app or web site, users can send a custom print order, or choose from a pre-determined item menu, their desired selection to the nearest 3D Print enabled service center. For 3D printing, both additive and subtractive manufacturing processes can be utilized. For example, manufacturing techniques can include fused deposition modeling, electron beam freeform fabrication, direct metal laser sintering, electron beam melting, selective laser melting, selective heat sintering, selective laser sintering, laminated object manufacturing, stereo lithography, digital light processing, and any 3D printing, including plaster-based, powder bed, and inkjet head 3D printing. Manufacturing techniques may also include automation of machine tools based on a digital model such as in computer numerical control (or CNC) techniques.

In order print items, instructions to the 3D printer may include any type of data and/or instructions that can be used by a 3D manufacturing apparatus to make an item. The 3D manufacturing instructions can include any data or instructions utilized in producing a physical object based on a digital model or data of the object. In one example, 3D manufacturing instructions may include combinations of dimensions, tolerances, and/or other part specifications that sufficiently describe the attributes of an item such that the item can be physically produced by a 3D manufacturing apparatus. In another example, 3D manufacturing instructions may include digital models such as may be provided by Computer-Aided-Design (CAD) files or files for computer modeling programs. In another example, 3D manufacturing instructions may include files in STL, PLY, or VRML formats, to name a few. In another example, 3D manufacturing instructions may also include files representing cross sections of digital models referenced for building physical models one layer at a time. In another example, 3D manufacturing instructions may also include executable code providing specific sequential instructions for controlling a 3D manufacturing apparatus to produce a physical Object.

Figure 23:
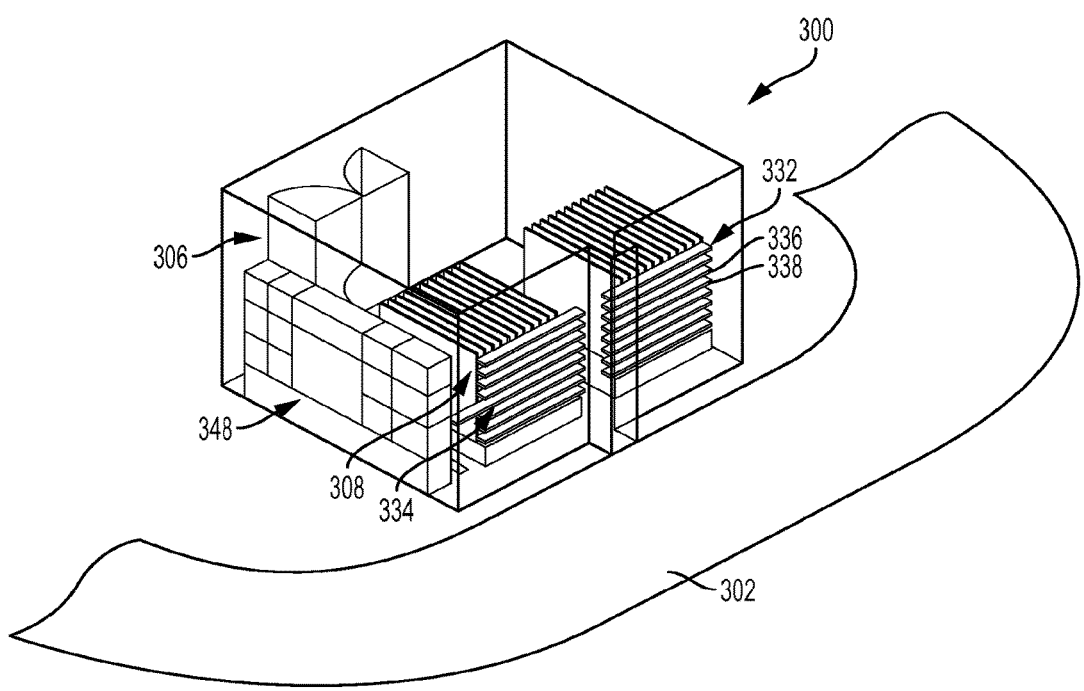
FIG. 23 depicts one embodiment of the service center.
Figure 24:
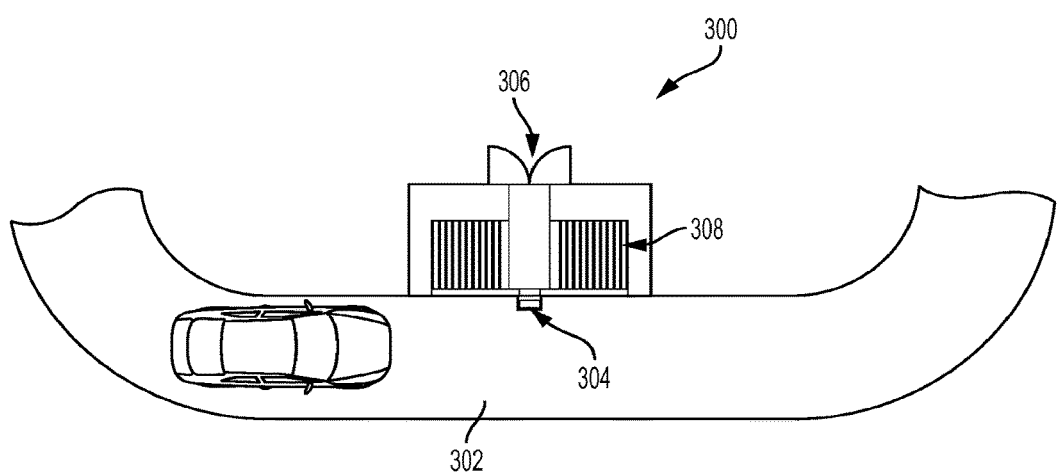
FIG. 24 depicts a top view of one embodiment of the proposed terminal.
Figure 25:
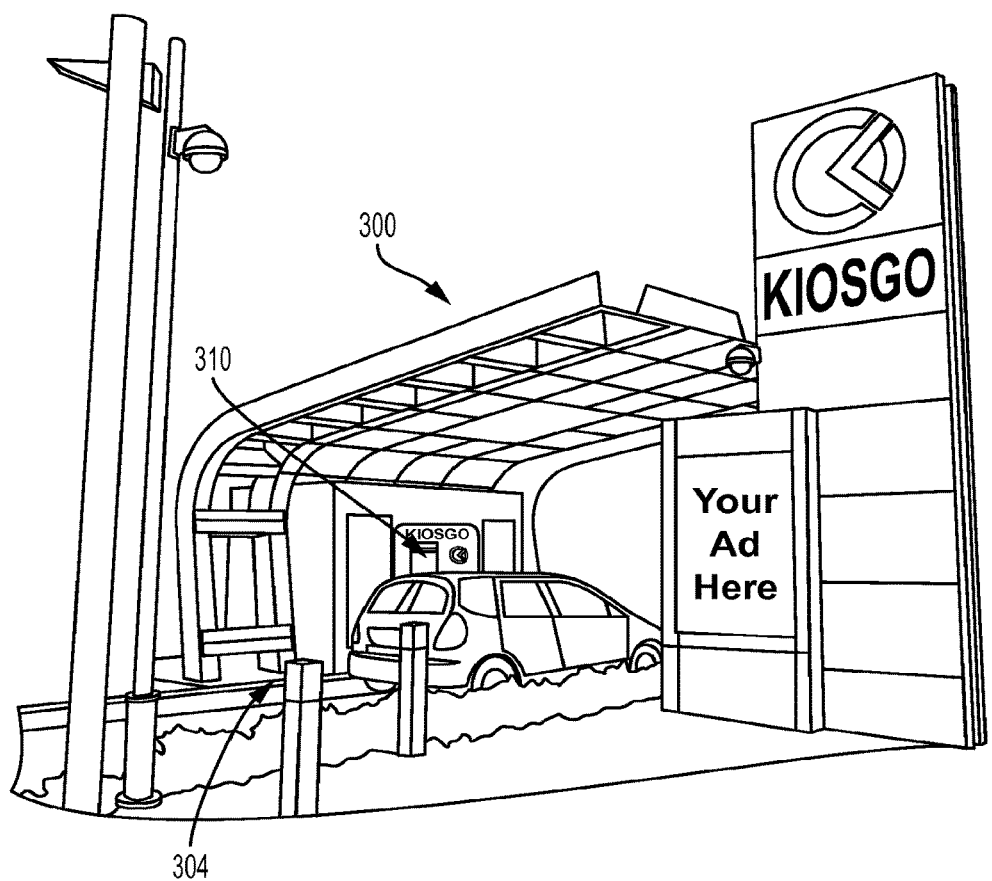
FIG. 25 depicts one embodiment of the proposed terminal.

One embodiment of a service center which incorporates a 3D printer (348) as shown in FIG. 23. The 3D printer (348) may be situated anywhere within the service center. In some embodiments, the 3D printer may have its own removal system. In preferred embodiments, the 3D printed items are distributed from the same retrieval chamber (320) as the items (342).

Figure 28A:
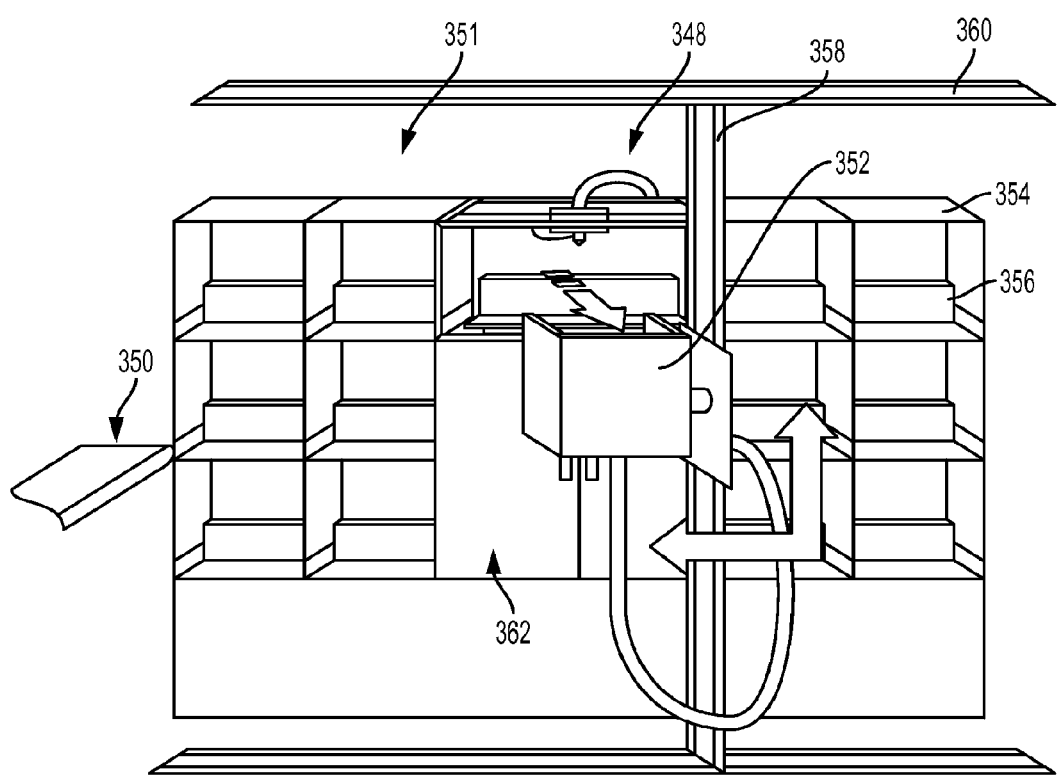
FIG. 28A-C depict one embodiment of the 3D printing assembly.
Figure 28B:
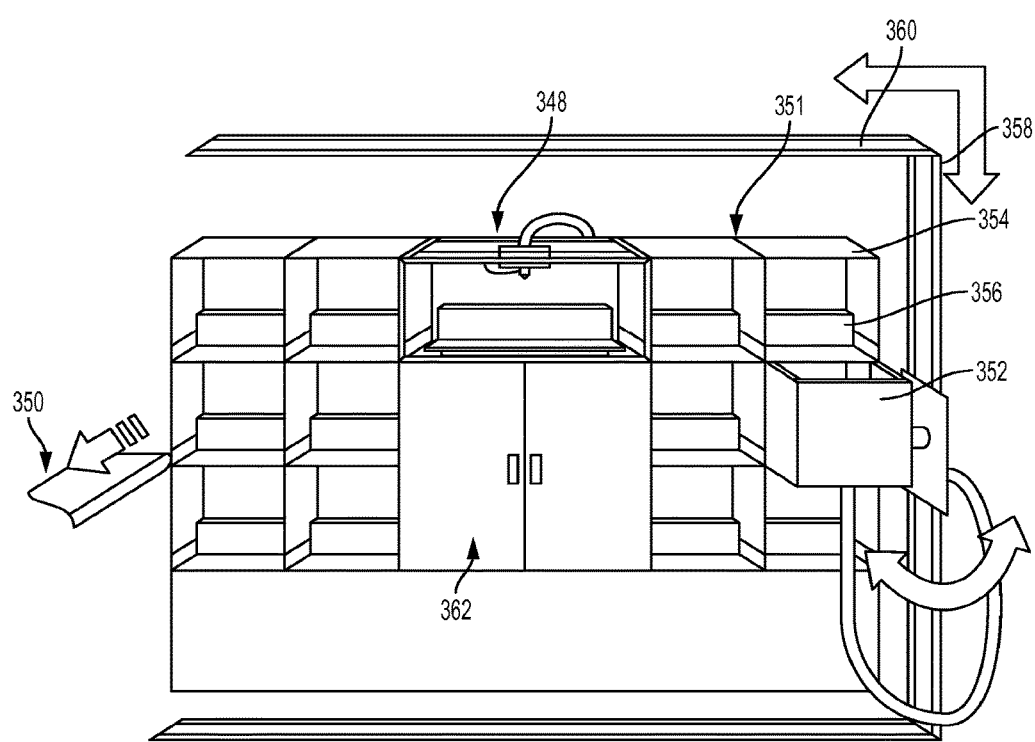
Figure 28C:
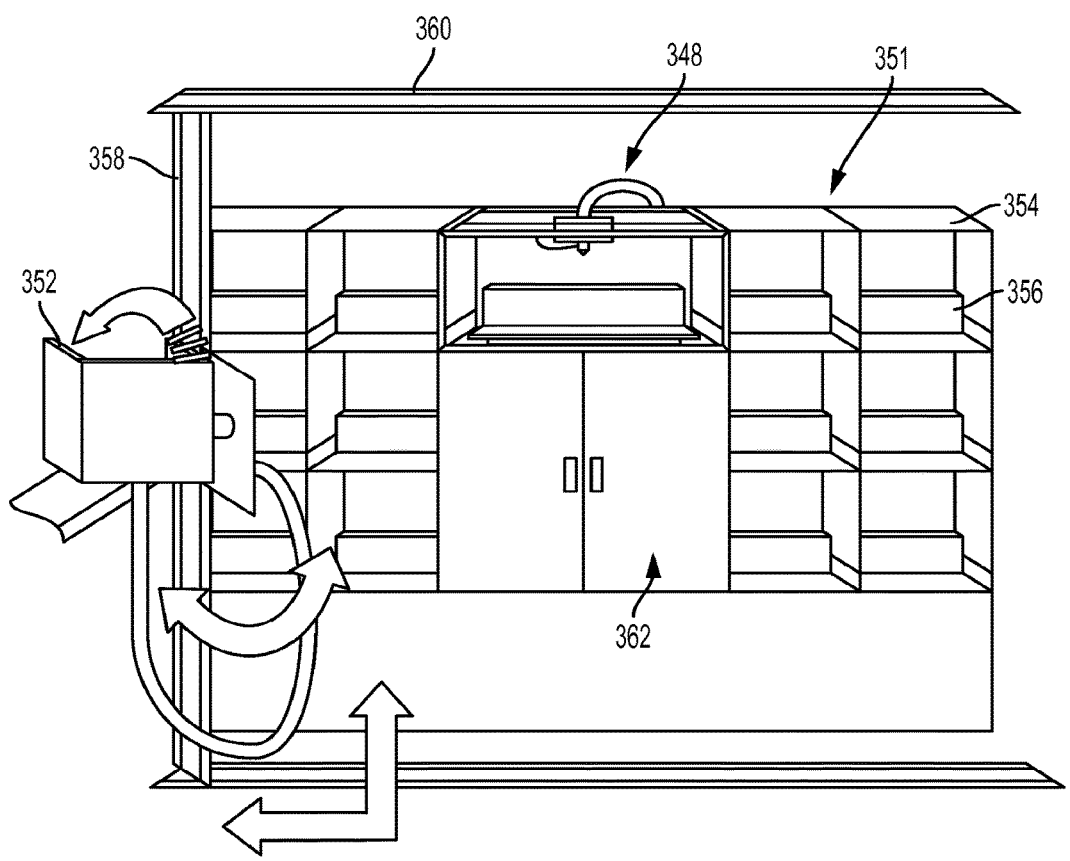

There are numerous ways to accomplish this, a preferred embodiment is described in FIGS. 28A-C. As can be seen in FIG. 23 the conveyor belt (350) may be extended beyond the shelving unit (332) to allow a transportation means to move 3D printed items onto the conveyor belt (350). There are various transportation means which may be used, for example, claws, suction, boxes, paddles, and other means as known in the art and other additional articulated mechanisms.

In some embodiments, the service center includes storage units for 3D printed items. Depending on the transportation means being used, the storage units (351) may be configured differently. For example, if the transportation means is a box (352); paddles may be placed within the box (352) and storage units (351) in order to facilitate transfer of the 3D printed items. In preferred embodiments, the storage unit (351) comprises a plurality of storage boxes (354). In some embodiments, some or all of the plurality of storage boxes (354) may contain a mechanism for facilitating the removal of the stored item. In a preferred embodiment, the mechanism may be a mechanical plank (356), other means as known in the art and as previously described may also be implemented to facilitate the removal of the stored item.

In an embodiment where the transfer means is a box (352), the box (352) may utilize a mechanism to move in X, Y, and Z directions. In some embodiments the mechanism comprises 1 arm, in other embodiments, the mechanism comprises two arms, in other embodiments, the mechanism comprises at least 3 arms. It is understood that arms may be made of one piece or multiple pieces. For example, in a one arm embodiment, the arm may consist of a number of joints which allow it to turn and move in a plurality of direction. In a two arm embodiment, the one arm may control an x-y direction while another arm may control rotation or a x-z direction. Other embodiments as known in the art may be practiced as well. In a preferred embodiment, the mechanism comprises one arm (358) for moving the box (352) in the y direction and z direction, as seen in FIGS. 28A-C. The arm (358) may also be attached to a track (360) for moving the arm (358) in the x direction separately. Another example of such a mechanism may be understood as an arm which moves along the multi-tiered 3D manufacturing module unit, receiving the 3D printed items by paddles (356) pushing the items into the box (352), then moving them into their respective storage boxes (354), ejecting the items by means of a mechanical plank (356).

Once the item or order is sent, the user is immediately billed for the custom job, which allows for the instant printing of their order at the selected service center. Once the order is generated at the desired service center, the completed order item is removed from the 3D printer (348) using an XYZ arm (358, 360), which places the custom 3D order into a storage box (354) on the interior wall of the service center. In some embodiments, the materials for printing are located beneath nozzle for printing, in the materials storage area (362). The materials storage area (362) may also contain additional areas and features as known in the art to improve the printing method. Once the item is check-out by the user using the unique identifier generated for and associated with that order (along with any other existing inventory items selected for that order), the custom 3D print order is removed from its storage cubicle (354) by the XYZ arm (358, 360), and placed onto a conveyor (350) that feeds from the 3D printing area of the service center into the main item bin (222), for customer item retrieval (along with any other selected items associated with the complete order). The items are dispensed and disbursed to the consumer, as usual.

Using the app or website, users may choose from a pre-determined item menu, or submit an allowable custom print order, and then selecting a specific 3D manufacturing enabled service center location. Once the items are check-out and the user is billed, the server immediately sends the order's associated instructions to the selected service center's 3D manufacturing apparatus. Once the order is generated at the desired service center, the completed order is removed from the 3D printing module using an articulated mechanical robotic receptacle—moving along a vertical y-axis track, which moves across horizontal x-axis, with guidance tracks along the top and bottom portions of the 3D manufacturing and storage unit. The articulated receptacle then places the custom 3D manufactured order into a storage cubicle next to and along the 3D printing unit. Once the cubicle's laser sensors confirm the deposit of the 3D print order, the cubicle and the completed 3D manufactured order within are registered with the associated unique identifier.

The user is then notified that the order has been generated is provided delivery instructions. Once the unique identifier is relayed from the smart device at the service center to the server, the server confirms and validates both the account and unique identifier, then sends the corresponding order to the service center for disbursement, including the associated custom 3D manufactured order; the terminal is activated, and begins to dispense the full order. The custom 3D manufactured order is removed from its storage cubicle by the articulated receptacle, and placed onto a conveyor that feeds from the 3D manufacturing unit into the main item bin, for customer item retrieval (along with any other selected items associated with the complete order). The items are dispensed and disbursed to the consumer, as usual.

An illustrative example of operation of the system is depicted as follows. A user breaks the heel of their shoe, or no longer wishes to continue wearing heeled shoes. The user utilizes their smart device to find the nearest 3D printing enable service center. Once located, the user selects a shoe they would like to wear, including size selection. After payment, the shoes are printed and stored until the user arrives to claim them. Advantages of this process allows the user a non-invasive way to make quick adjustments to their wardrobe. Conventional methods would require either returning home, or going to an establishment which contained the desired products. In the case of going to an establishment, there is also no guarantee that an appropriate substitute might be found.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory, or other memory technology, Compact Disc Read-Only Memory ("CD-ROM"), digital versatile disk (DVD) or other optical storage, magnetic cassettes, magnetic tape, magnetic disk storage or other magnetic storage devices or any other medium, which can be used to store the desired information and which can be accessed by the a system device. Based on the disclosure and teachings provided herein, a person of ordinary skill in the art will appreciate other ways and/or methods to implement the various embodiments. In addition, different embodiments of the invention may include, or not include, the various features described above. In other words, different combinations of the features described above are contemplated.

What is claimed:

1. A service center for automated vending of goods, the service center comprising:
   an enclosed structure that houses a storage assembly, the storage assembly comprising one or more shelving units, each shelving unit comprising:
      a plurality of shelves that are arranged along a vertical axis; and
      for each shelf, a distribution mechanism positioned at a front edge of the shelf such that items on the shelf can be transferred to the distribution mechanism, the distribution mechanism having an outer end and an inner end, the distribution mechanism being configured to transport the items that are transferred from the shelf in a direction towards the inner end of the distribution mechanism;
   a receptacle that is configured to travel along a vertical axis such that the receptacle can be positioned at the inner end of each distribution mechanism thereby allowing items on a particular distribution mechanism to be advanced from the distribution mechanism and into the receptacle when the receptacle is positioned at the inner end of the distribution mechanism; and
   a retrieval chamber that is accessible from outside the enclosed structure, the retrieval chamber being configured to receive the receptacle after the receptacle has been filled with one or more items such that a user can retrieve the one or more items from the retrieval chamber.

2. The service center of claim 1, wherein the one or more shelving units comprise two shelving units that are positioned on opposing sides of the receptacle.

3. The service center of claim 1, wherein the distribution mechanism is a conveyor.

4. The service center of claim 1, wherein one or more of the shelves includes a plurality of spacers for defining chambers into which multiple items of the same type can be placed.

5. The service center of claim 4, wherein each chamber includes a mechanism for pushing items from the chamber and onto the distribution mechanism.

6. The service center of claim 5, wherein the mechanism for pushing items is one of:
   a rotating coil;
   a sloped surface with a quick release-and-reset mechanism; or
   a paddle.

7. The service center of claim 1, wherein the spacers are configured to form larger chambers on higher shelves and smaller chambers on lower shelves.

8. The service center of claim 1, wherein the receptacle is coupled to a lift track along which the receptacle travels.

9. The service center of claim 1, wherein the receptacle is coupled to the lift track via a mechanical arm.

10. The service center of claim 9, wherein the mechanical arm telescopes outwardly to cause the receptacle to be received within the retrieval chamber.

11. The service center of claim 10, wherein the retrieval chamber is positioned towards a bottom of the service center.

12. The service center of claim 11, further comprising:
control logic that is configured to cause the receptacle to be filled with items from higher shelves prior to items from lower shelves.

13. The service center of claim 1, wherein the receptacle is configured to be inverted after being withdrawn from the retrieval chamber and prior to receiving items from any distribution mechanisms.

14. The service center of claim 1, further comprising:
a terminal accessible outside the enclosed structure, the terminal providing an interface for a user to cause the receptacle to be filled with one or more items and then positioned within the retrieval chamber.

15. The service center of claim 14, wherein the terminal is configured to receive input from the user or from the user's mobile device, the input causing the receptacle to be filled with one or more items that the user had previously purchased and then causing the receptacle to be positioned within the retrieval chamber.

16. The service center of claim 1, wherein the receptacle includes sloped inner surfaces.

17. The service center of claim 1, further comprising:
a 3-D printer;
a storage unit positioned adjacent one of the shelving units, the storage unit forming one or more storage boxes within which 3-D printed items can be stored; and
a transfer mechanism configured to retrieve selected items from the one or more storage boxes and to deliver the items to one of the distribution mechanisms of the adjacent shelving unit.

18. The service center of claim 1, wherein the distribution mechanism to which the transfer mechanism delivers the items extends further towards the storage unit than the other distribution mechanisms of the shelving unit.

19. A service center for automated vending of goods, the service center comprising:
an enclosed structure that houses a storage assembly, the storage assembly comprising one or more shelving units, each shelving unit comprising:
a plurality of shelves that are arranged along a vertical axis; and
for each shelf, a distribution mechanism positioned at a front edge of the shelf such that items on the shelf can be transferred to the distribution mechanism, the distribution mechanism having an outer end and an inner end, the distribution mechanism being configured to transport the items that are transferred from the shelf in a direction towards the inner end of the distribution mechanism;
a receptacle that is configured to travel along a vertical axis such that the receptacle can be positioned at the inner end of each distribution mechanism thereby allowing items on a particular distribution mechanism to be advanced from the distribution mechanism and into the receptacle when the receptacle is positioned at the inner end of the distribution mechanism;
a retrieval chamber that is accessible from outside the enclosed structure; and
control logic that is configured to:
in response to user input that represents a purchase of one or more items available within the service center, identify which shelves the one or more items are stored on;
for each identified shelf, cause the receptacle to be positioned at the inner end of the distribution mechanism while at least one of the one or more items is advanced into the receptacle; and
after each of the one or more items has been advanced into the receptacle, cause the receptacle to be moved into the retrieval chamber.

20. A service center for automated vending of goods, the service center comprising:
an enclosed structure that houses a storage assembly, the storage assembly comprising one or more shelving units, each shelving unit comprising:
a plurality of shelves that are arranged along a vertical axis; and
for each shelf, a distribution mechanism positioned at a front edge of the shelf such that items on the shelf can be transferred to the distribution mechanism, the distribution mechanism having an outer end and an inner end, the distribution mechanism being configured to transport the items that are transferred from the shelf in a direction towards the inner end of the distribution mechanism;
a receptacle that is configured to be positioned at the inner end of each distribution mechanism thereby allowing items on a particular distribution mechanism to be delivered from the distribution mechanism and into the receptacle when the receptacle is positioned at the inner end of the distribution mechanism;
a retrieval chamber that is accessible from outside the enclosed structure, the retrieval chamber being configured to allow a user to retrieve one or more items from the receptacle when the receptacle is positioned within the retrieval chamber.

* * * * *